June 22, 1948.　　　G. A. LENSKY ET AL　　　2,443,793
PATTERN CONTROLLED MACHINE TOOL

Filed Jan. 15, 1945　　　　　　　　　　　　　13 Sheets-Sheet 1

INVENTORS
GEORGE A. LENSKY
WINTHROP TRIBLE
EDWARD W. YATES
BY Leigh W. Wright.
ATTORNEY.

June 22, 1948.  G. A. LENSKY ET AL  2,443,793
PATTERN CONTROLLED MACHINE TOOL
Filed Jan. 15, 1945  13 Sheets-Sheet 2

INVENTORS
GEORGE A. LENSKY
WINTHROP TRIBLE
BY EDWARD W. YATES
Leigh W. Wright
ATTORNEY

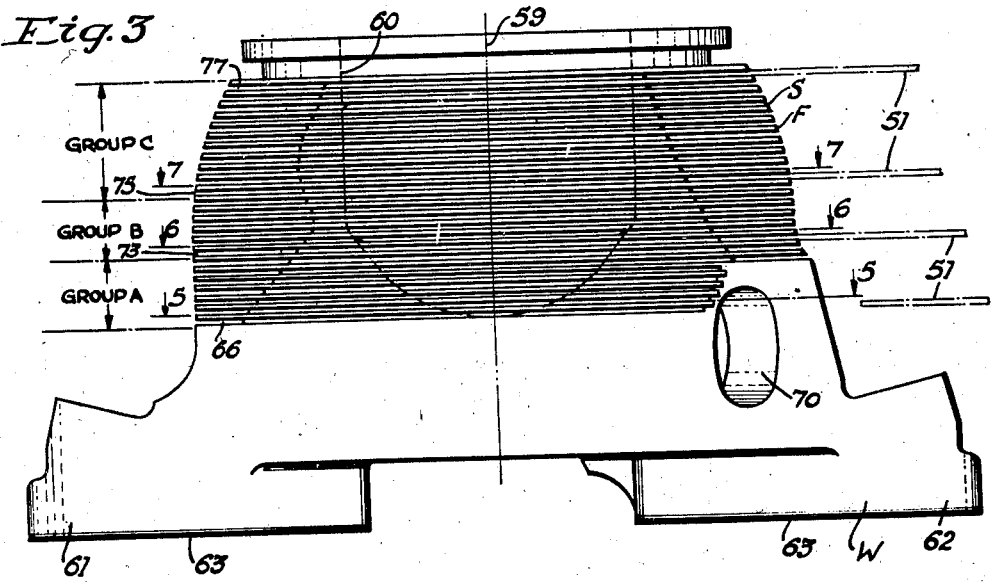
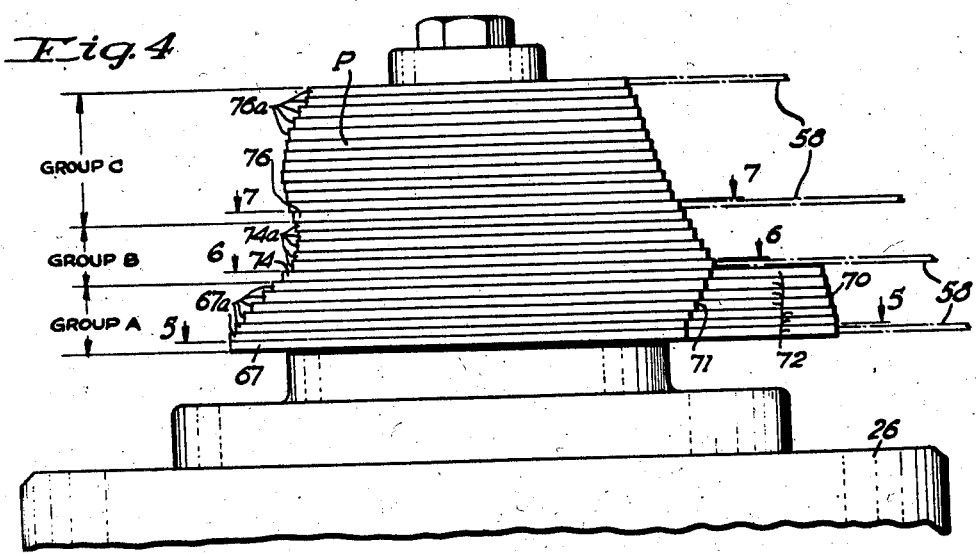

GROUP A

June 22, 1948.  G. A. LENSKY ET AL  2,443,793
PATTERN CONTROLLED MACHINE TOOL

Filed Jan. 15, 1945  13 Sheets-Sheet 10

INVENTORS
GEORGE A. LENSKY
WINTHROP TRIBLE
BY EDWARD W. YATES
Leigh W. Wright.
ATTORNEY June 22, 1948.   G. A. LENSKY ET AL   2,443,793
PATTERN CONTROLLED MACHINE TOOL
Filed Jan. 15, 1945   13 Sheets-Sheet 11

INVENTORS
GEORGE A. LENSKY
WINTHROP TRIBLE
BY EDWARD W. YATES
Leigh W. Wright.
ATTORNEY

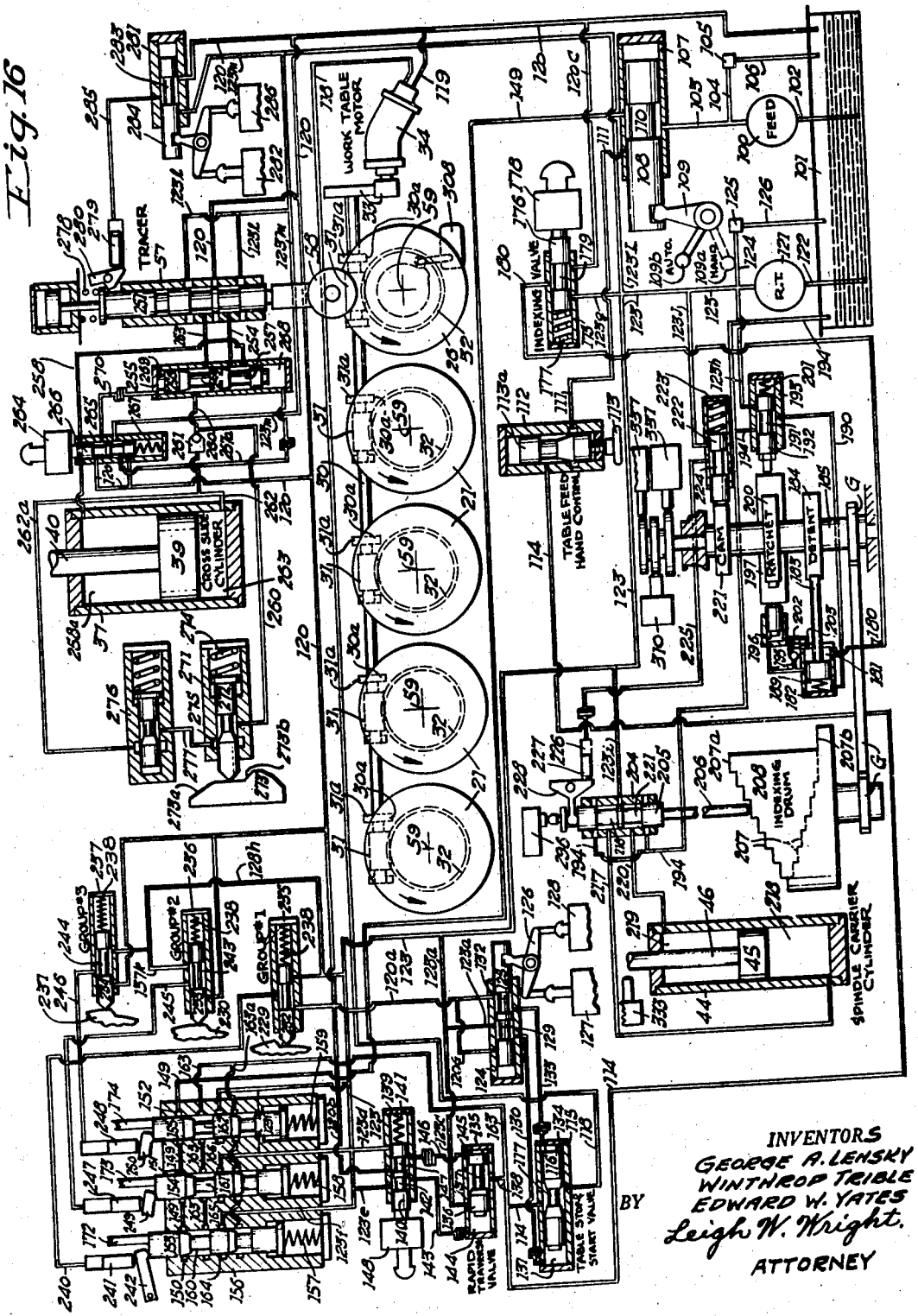

Patented June 22, 1948

2,443,793

UNITED STATES PATENT OFFICE 2,443,793

PATTERN CONTROLLED MACHINE TOOL

George A. Lensky, Winthrop Trible, and Edward W. Yates, Cincinnati, Ohio, assignors to The Cincinnati Milling Machine Co., Cincinnati, Ohio, a corporation of Ohio Application January 15, 1945, Serial No. 572,908

26 Claims. (Cl. 90—13.4)

This invention relates to machine tools and more particularly to automatic pattern controlled milling machines.

One of the objects of this invention is to provide a machine for automatically progressively producing profile surfaces on the periphery of rotatable work pieces from a pattern or master.

Another object of this invention is to provide an automatic pattern controlled airplane cylinder head fin milling machine.

Still another object is to provide a pattern controlled milling machine for successively producing profile surfaces on a work piece while automatically changing the characteristics of the operating cycle as different operations of the work piece are completed.

Another object of this invention is to provide an improved automatic pattern controlled milling machine for machining simultaneously a series of non-contiguous profile surfaces on a plurality of revolving work pieces in one continuous automatic cycle.

And a still further object is to provide an improved combined electric and hydraulic operating and control circuit of a rotary profile milling machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Throughout the several views of the drawings similar reference characters are employed to denote the same or similar parts.

Figure 3 is an enlarged elevational view of a typical work piece capable of being operated upon by this machine.

Figure 4 is a right hand end elevation of the pattern array for controlling the operation of the machine.

Figure 5:
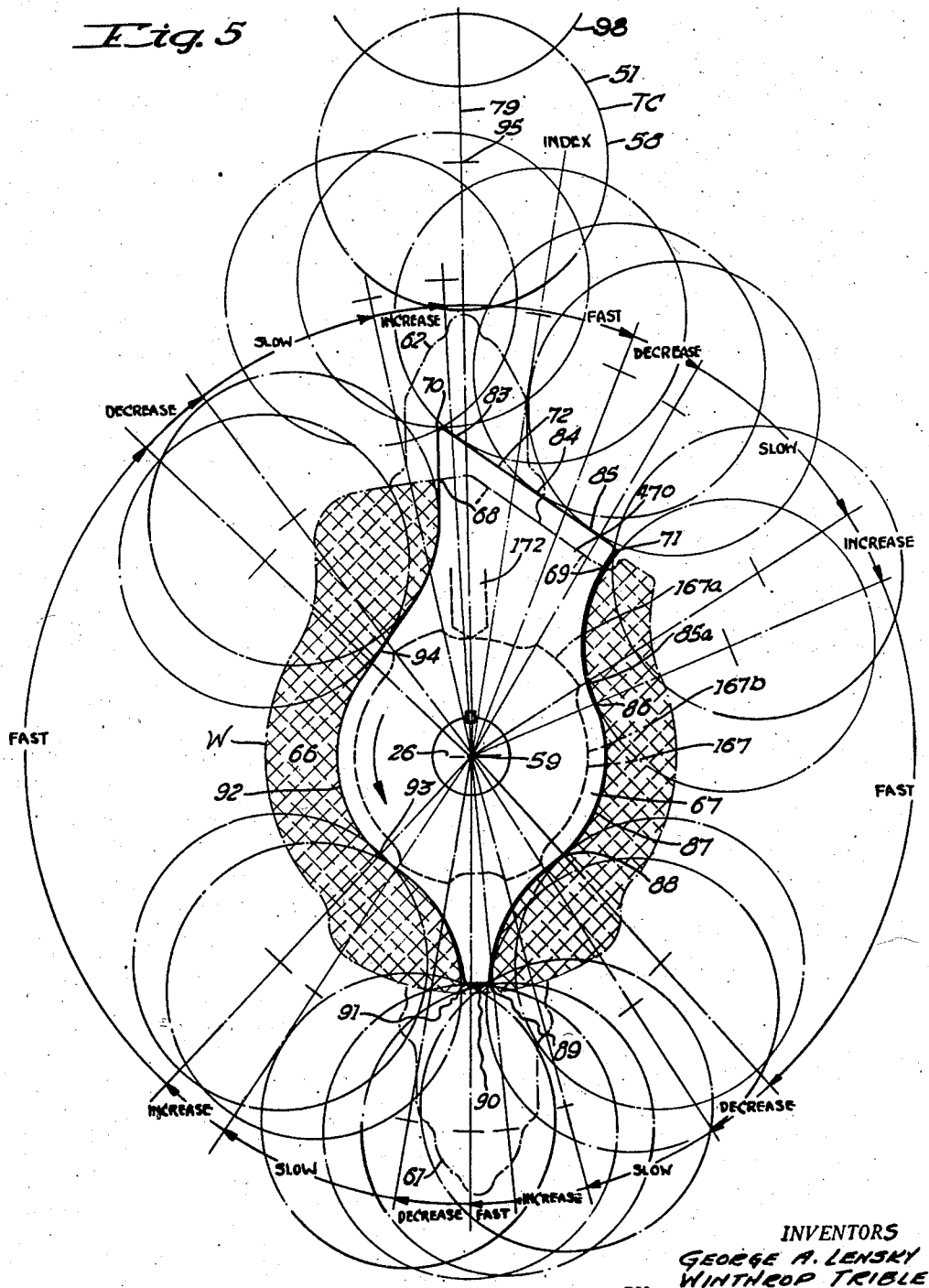
Figure 5 is a diagrammatic view, indicated by the line 5—5 in Figures 3 and 4, showing the relationship of work piece, pattern, cutter, and tracer during the machining of one portion of the work piece of Figure 3.
Figure 6:
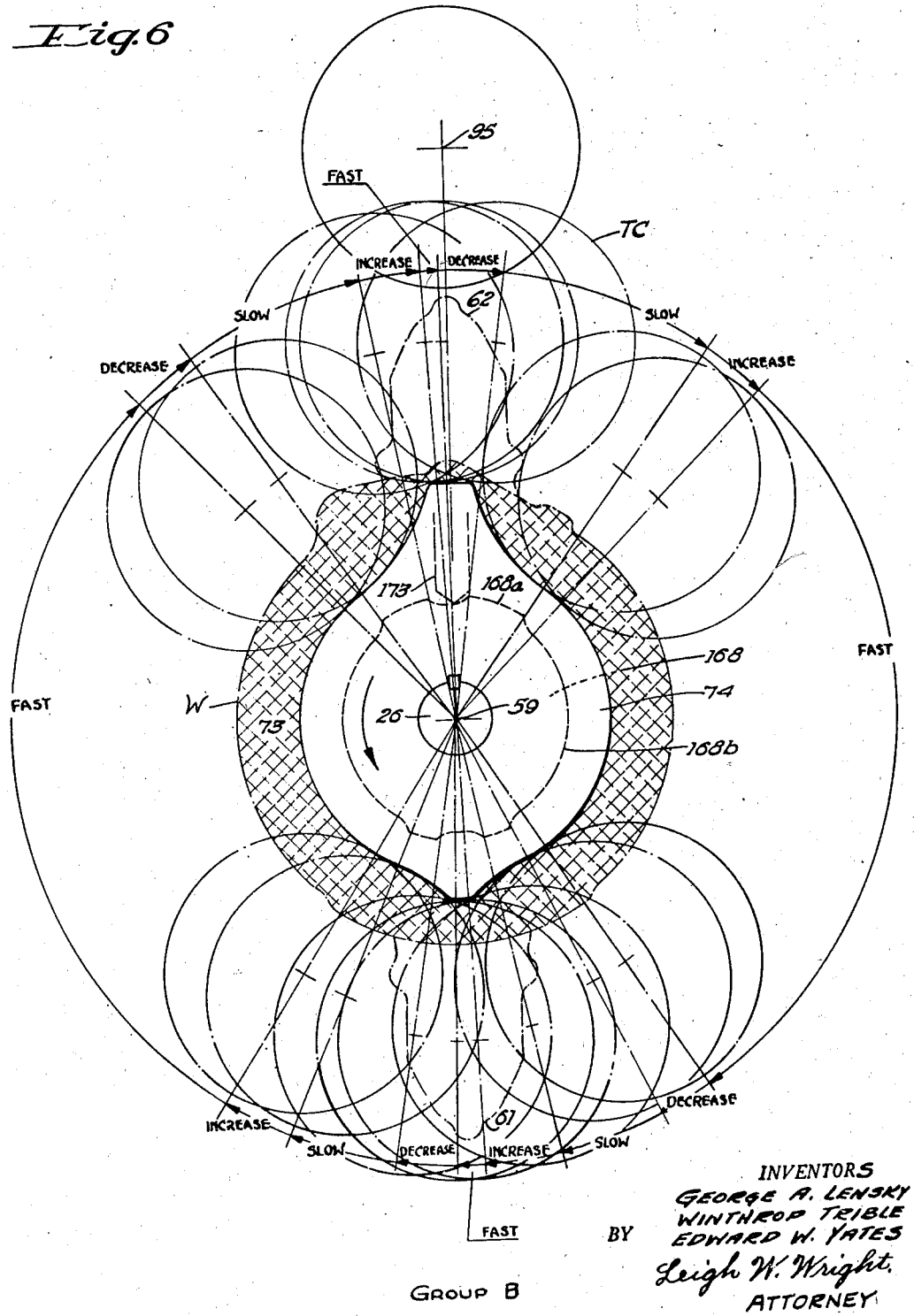
Figure 6 is a diagrammatic view similar to Figure 5, indicated by the line 6—6 in Figures 3 and 4, showing the relationship of work piece, pattern, cutter, and tracer when another portion of the work piece is being machined.
Figure 7:
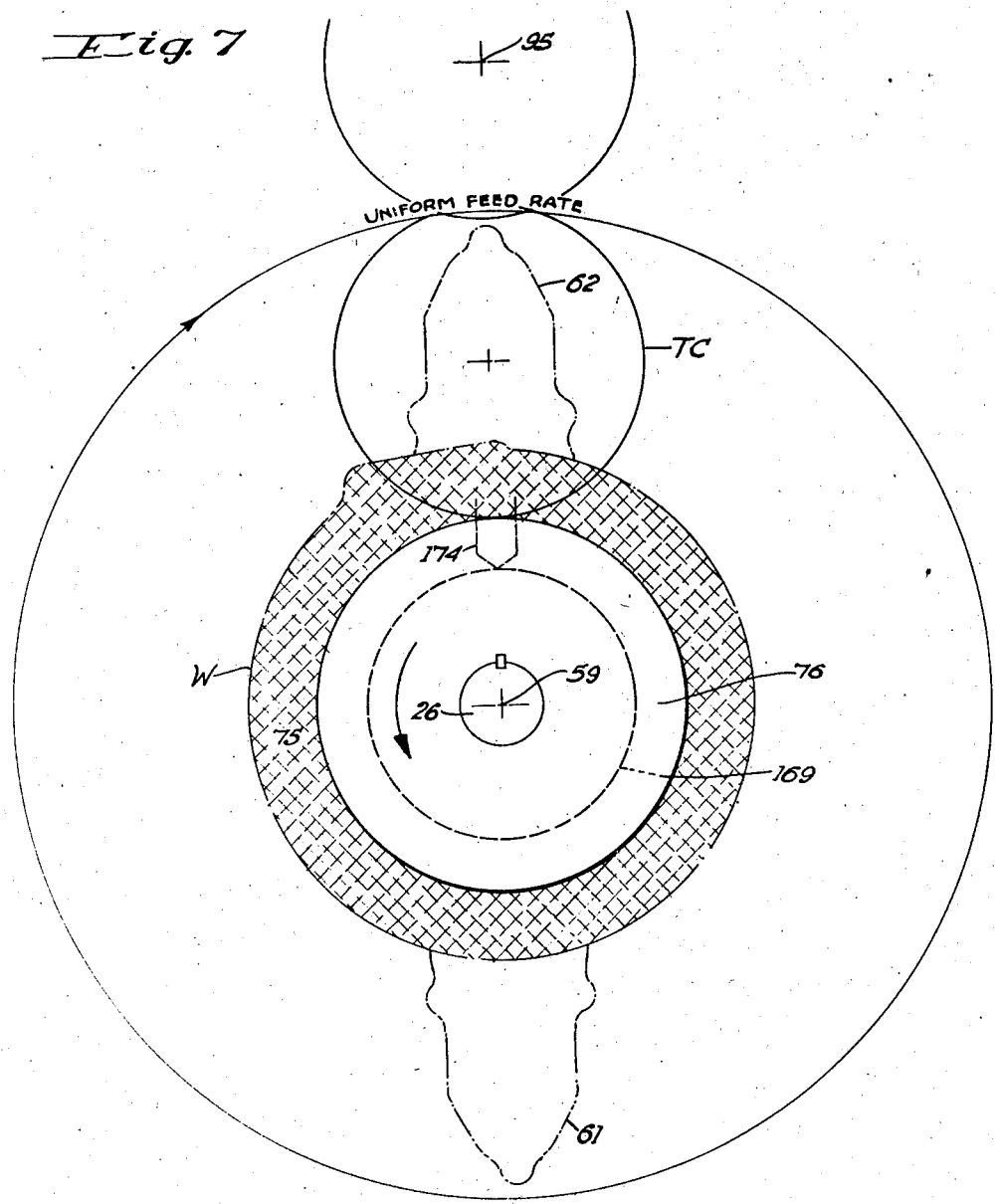

Figure 7 is a diagrammatic view similar to Figures 5 and 6, indicated by the line 7—7 of Figures 3 and 4, showing the relationship of work piece, pattern, cutter, and tracer, when still another portion of the work piece of Figure 3 is being machined.

Figure 1:
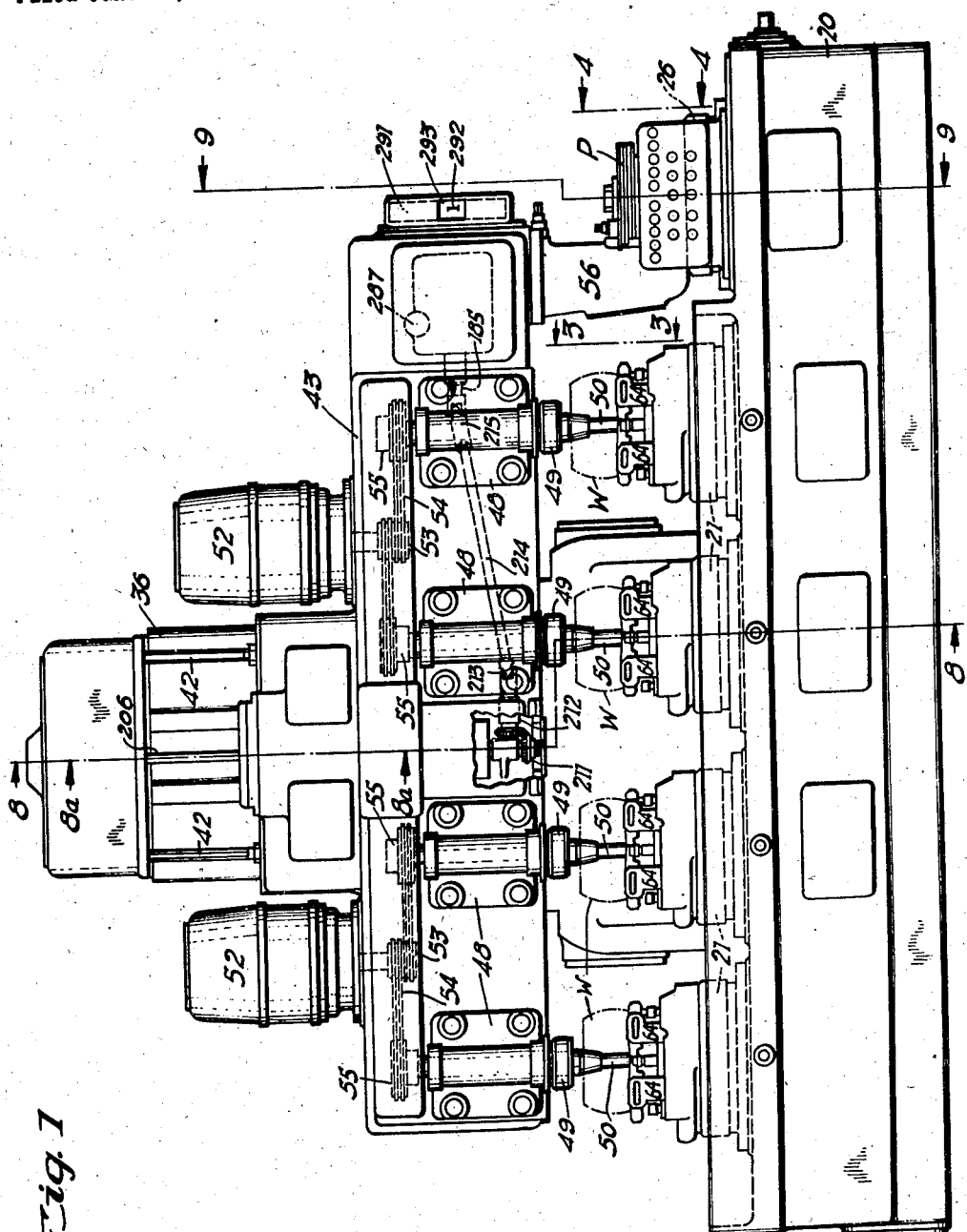
Figure 1 is a front elevational view of a multiple spindle pattern controlled milling machine incorporating the features of this invention.
Figure 8:
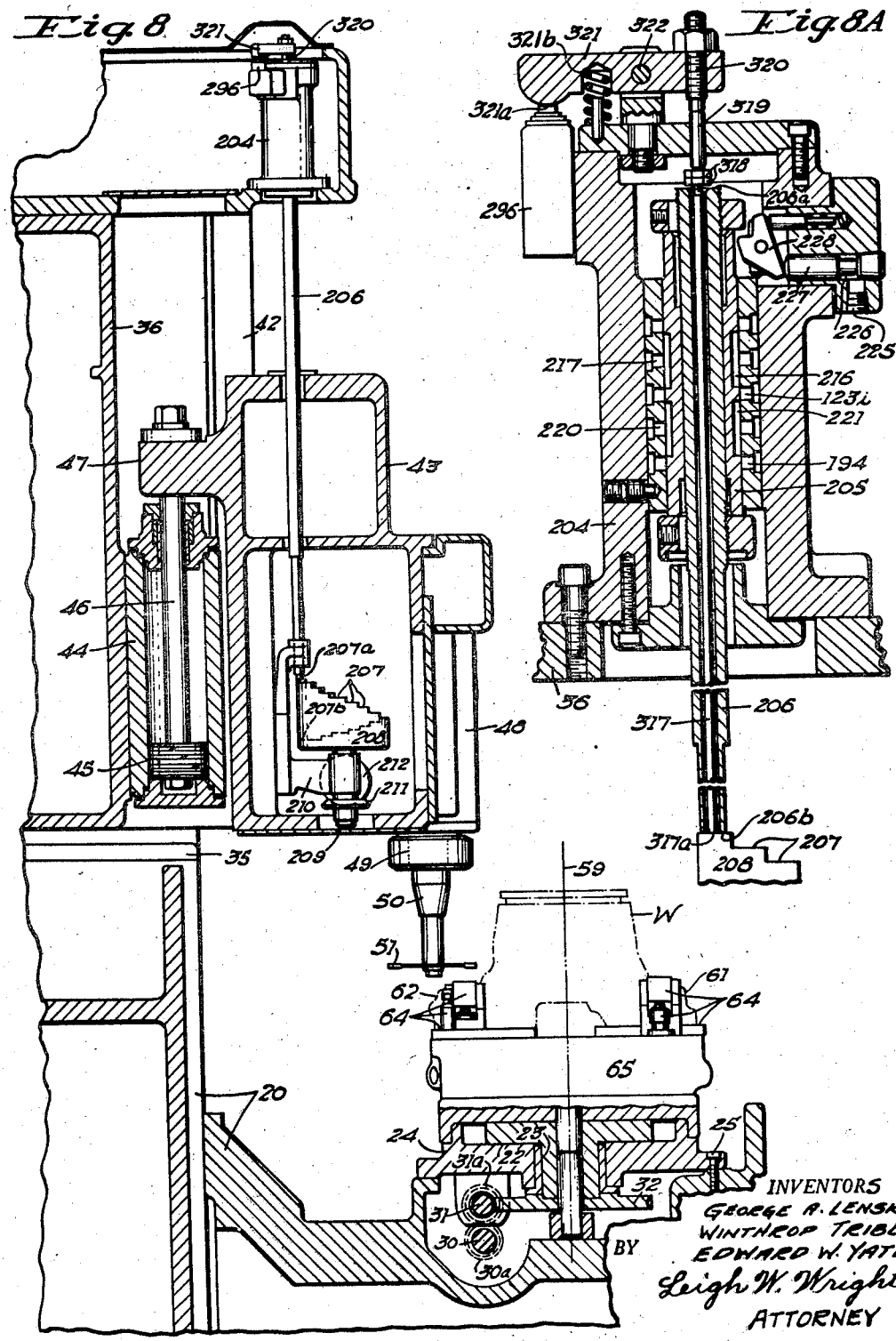

Figure 8 is a fragmentary enlarged vertical section through the machine on the line 8—8 of Figure 1.

Figure 8a is an enlarged section through the vertical indexing servo-control valve on the line 8a—8a of Figure 1.

Figure 9:
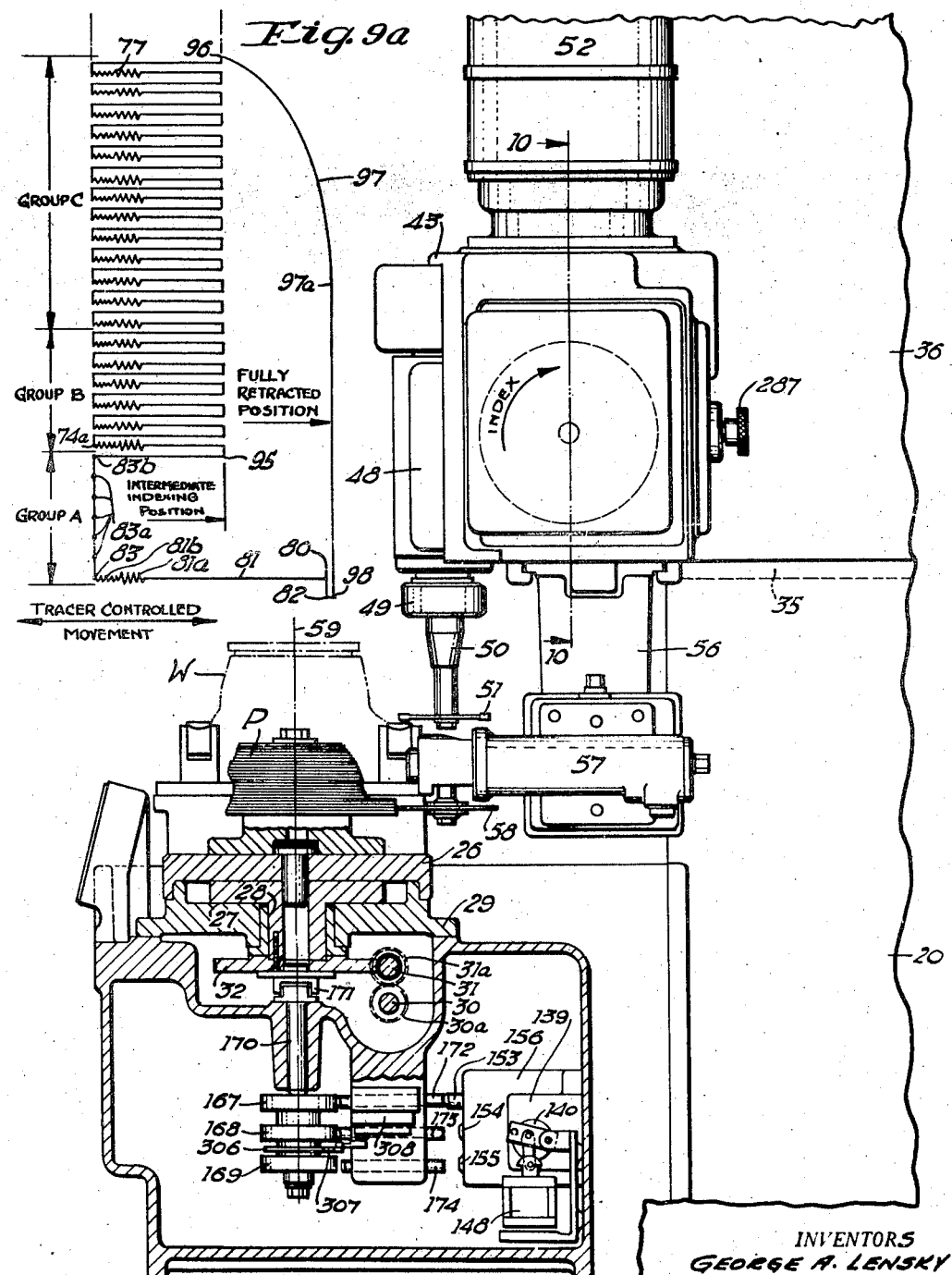

Figure 9 is a fragmentary vertical section on the line 9—9 of Figure 1.

Figure 9a is a diagram showing the path of relative movement of cutter and work, and tracer and pattern during a complete automatic work cycle of the machine.

Figure 10:
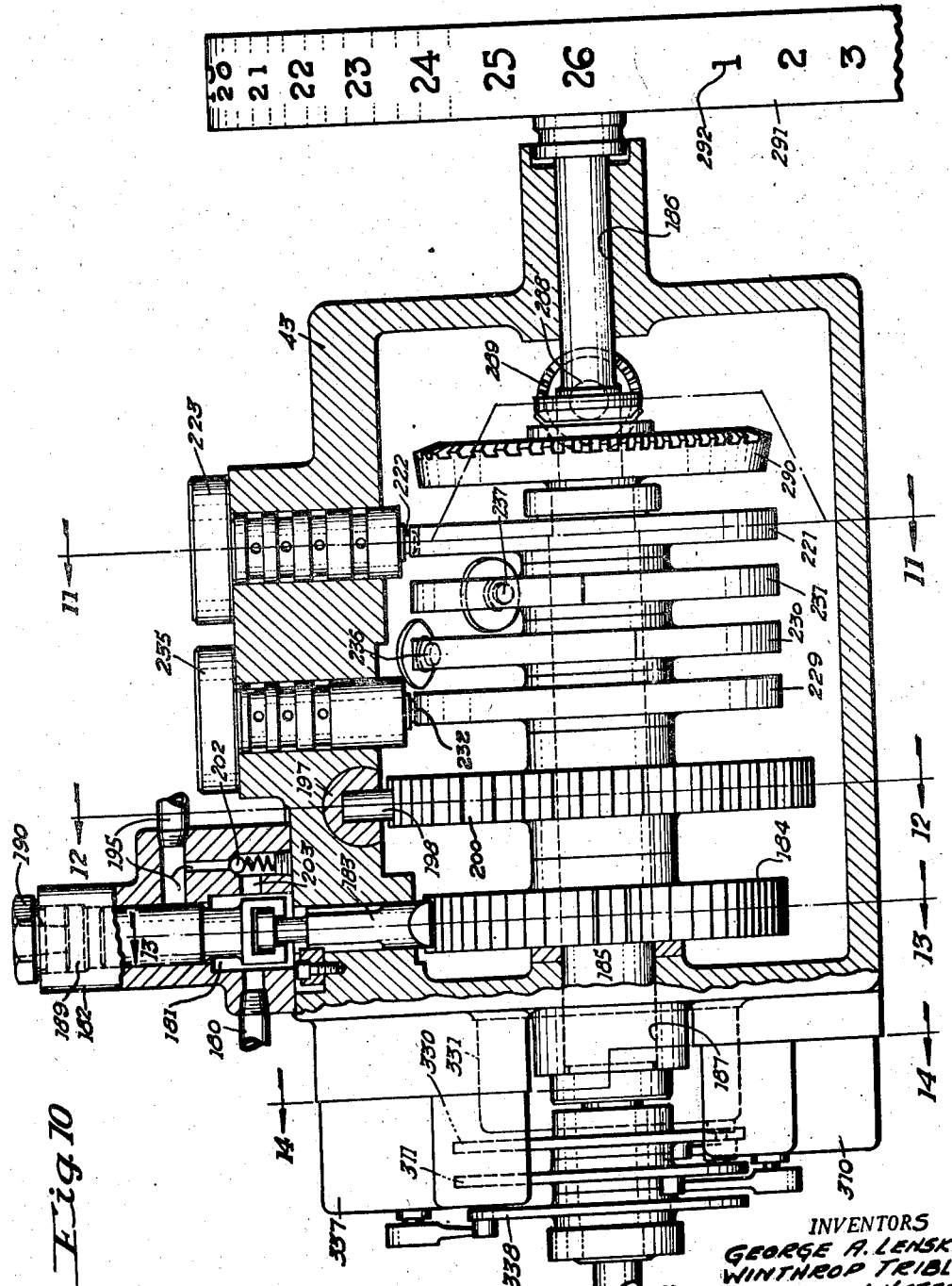

Figure 10 is a section through the indexing control mechanism of the machine indicated by the line 10—10 of Figures 9, 11, 12, 13, and 14.

Figure 11:
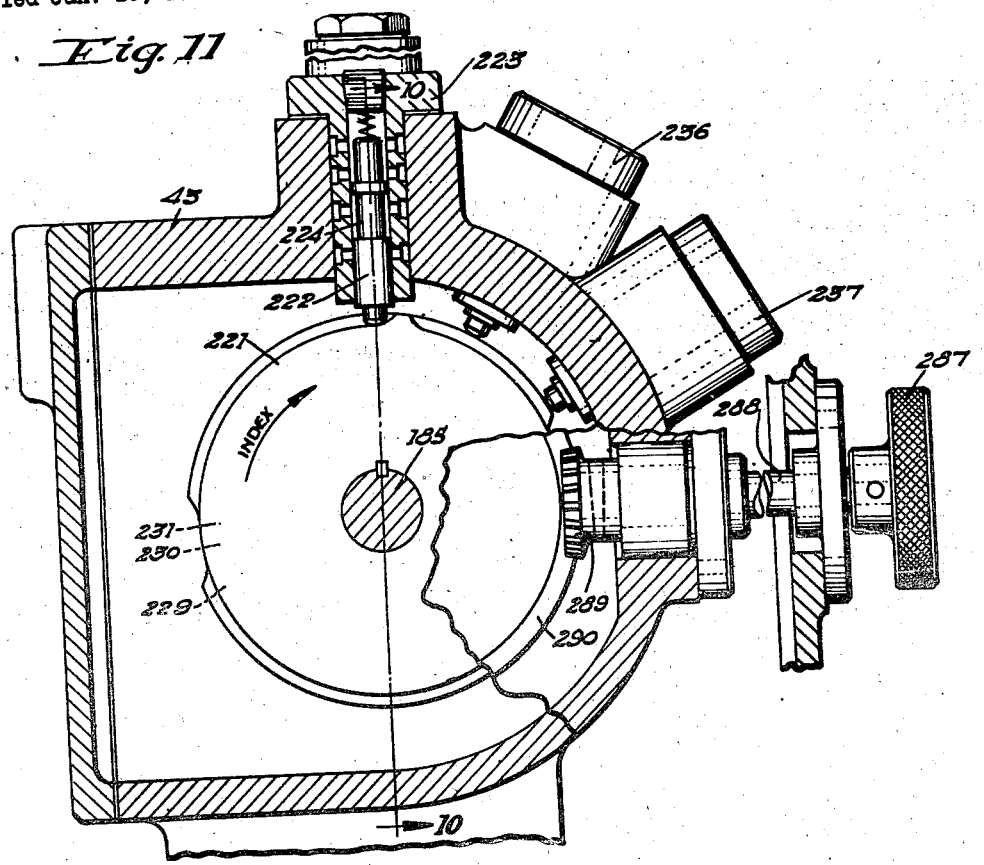

Figure 11 is an enlarged transverse section through the indexing control mechanism indicated on the line 11—11 of Figure 10.

Figure 12:
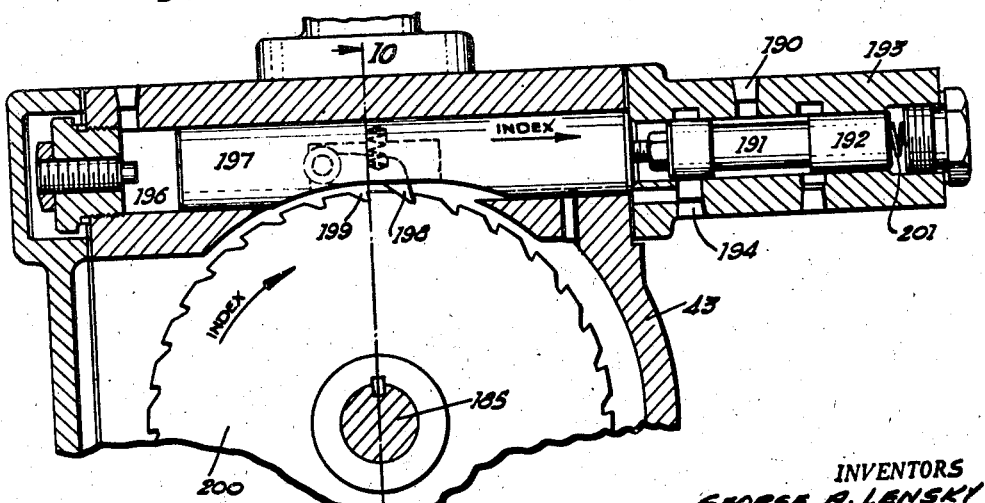

Figure 12 is a fragmentary enlarged transverse section through the indexing control mechanism indicated on the line 12—12 of Figure 10.

Figure 13:
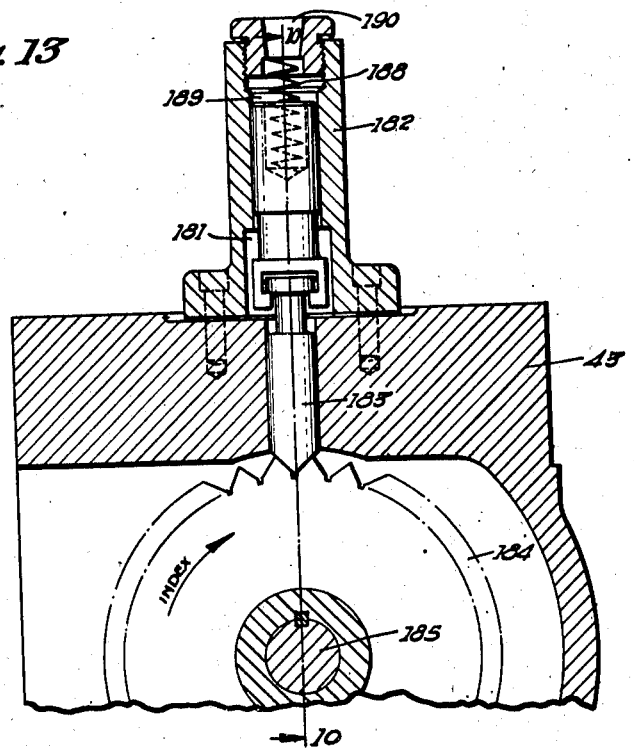

Figure 13 is an enlarged fragmentary transverse section on the line 13—13 of Figure 10.

Figure 14:
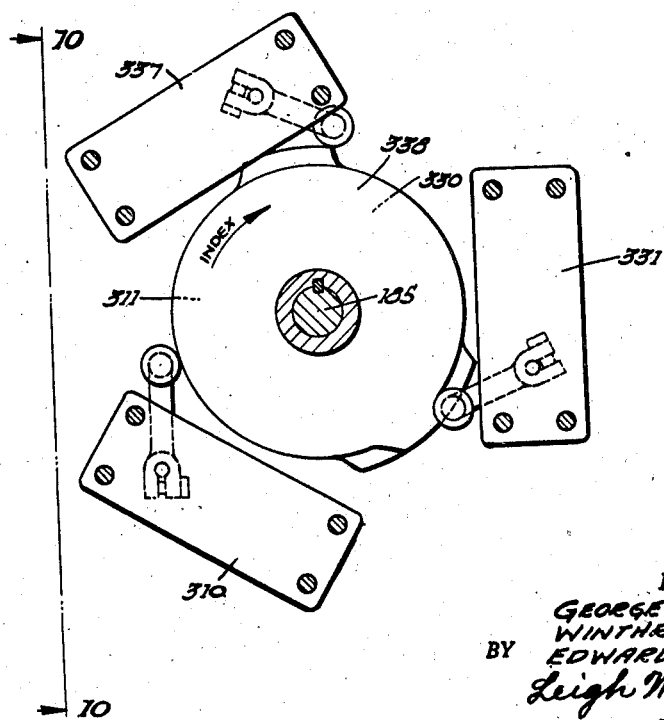

Figure 14 is an enlarged sectional view on the line 14—14 of Figure 10.

Figure 15:
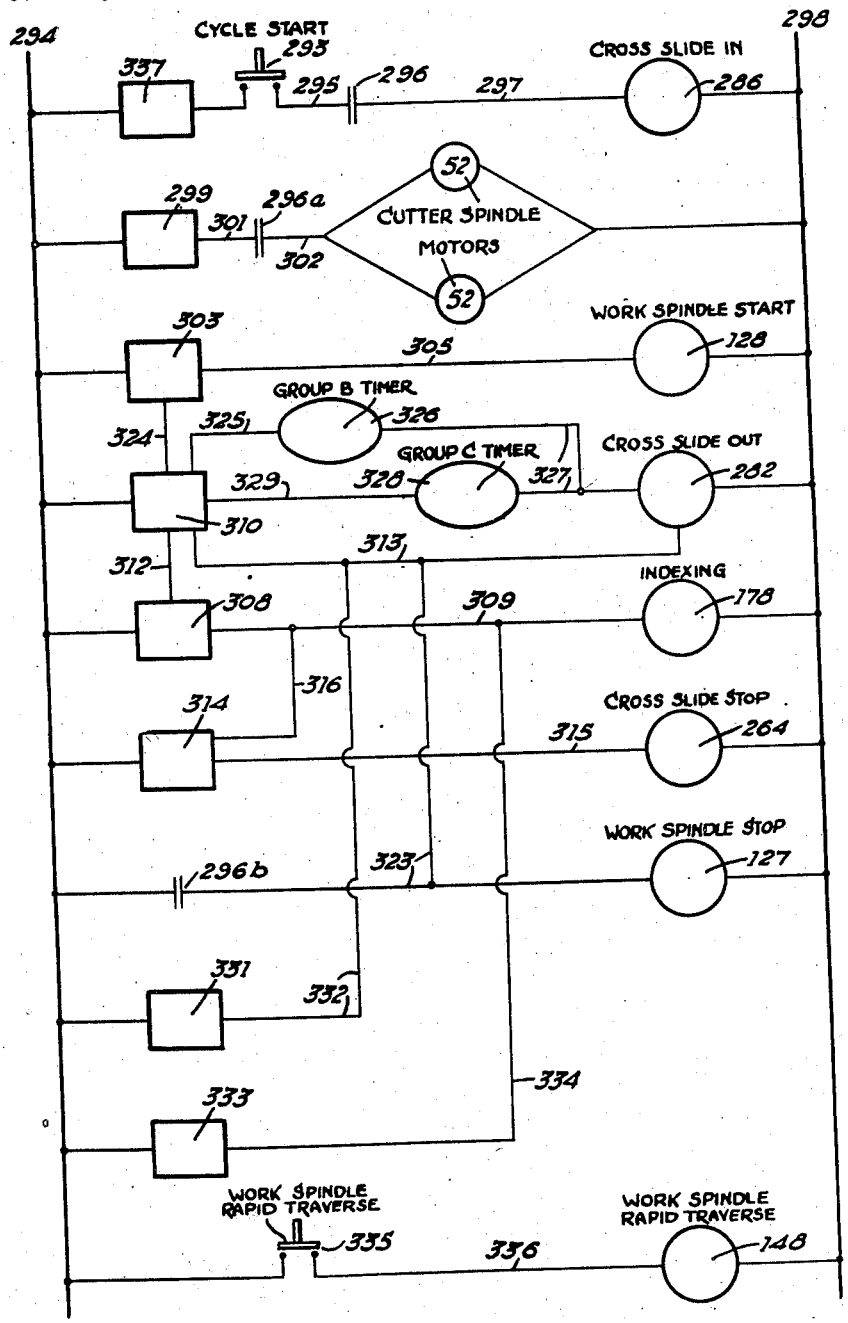

Figure 15 is an elementary wiring diagram of the electric control circuit of the machine.

Figure 16 is a diagram of the hydraulic operating circuit for the machine.

In its simplest form this invention contemplates the progressive machining of a series of axially spaced irregular profile surfaces on the periphery of a rotating work piece. These surfaces may be of non-continuous or of continuous character for different groups of the series of profile surfaces and with this arrangement the character of the machining cycle for each group is automatically changed to adapt the machining operation to the particular group or portion of the work piece being operated upon.

As an example of a machine adapted to perform such operations, there is illustrated a multiple spindle pattern controlled milling machine for machining slots in airplane cylinder heads to form the heat radiating fins thereon.

Work spindle drive

Such a machine comprises a base 20 upon which are appropriately journaled a series of rotary work tables, work spindles or supports 21 on suitable bearing surfaces 22 and 23, Figure 8, formed on a suitable support 24 rigidly fixed to the base 20 by screws 25. A pattern spindle or support 26, Figure 9, is similarly journaled on the base by appropriate bearing surfaces 27 and 28 formed in the support 29 fixed on the base. The work spindles 21 and the pattern spindle 26 are rotated synchronously through a common drive shaft 30, Figure 16, upon which is mounted a series of gears 30a driving gears 31a connected with the identical worms 31 journaled in the base 20. These worms operatively engage identical worm wheels 32 appropriately fixed to the rotatable spindles 21 and 26 so that upon rotation of the shaft 30 all of the spindles recited will be rotated in exact timed relationship. The shaft 30 is provided with a suitable gear driving connection 33 with the hydraulic feeding or table rotating motor 34 so that when this motor is actuated the spindles are similarly rotated in accordance with the operation of the motor 34.

Cross slide

On the rearwardly extending portion of the base 20 are formed guideways 35 upon which is slidably mounted the cross slide housing 36 for movement to and from the rotary spindles 21 and 26. This cross slide 36 is actuated and controlled in cross feeding movement in either direction by means of a hydraulic actuator or cylinder 37, Figure 2, which is rigidly fixed to the surface 38 of the base 20 and has operating therein a piston 39 to which is attached the piston rod 40 connected to an integral lug 41 formed on the cross slide 36 so that by the application of fluid pressure in the cylinder 37 its piston 39 and thereby the cross slide 36 may be reciprocated.

Spindle carrier

On appropriate vertically disposed guideways 42 formed on the front face of the cross slide 36 is mounted for vertical movement the spindle carrier 43 which may be reciprocated vertically by means of a hydraulic cylinder 44, Figure 8, which is rigidly mounted on the cross slide 36 and has a piston 45 and an associated piston rod 46 attached to an integral lug 47 of the spindle carrier 43 so that upon appropriate application of fluid pressure in the cylinder 44 the spindle carrier 43 may be raised or lowered on the guideways 42.

The spindle carrier 43 comprises a horizontally elongated housing upon which is fixed a series of spindle support brackets 48 in which are appropriately journaled the cutter spindles 49. Each of these cutter spindles carry a cutter arbor 50 upon which is mounted the desired rotary milling cutters 51. Each pair of spindles 49 is driven by one of the spindle rotating motors 52 mounted on the spindle carrier 43 connected through their respective motor pulleys 53 and belts 54 to appropriate pulleys 55 carried by the rotary cutter spindles 49, so that the spindles may be thus rotated at the desired cutting speed for any vertical positioning of the spindle carrier on the cross slide 36.

Also carried on the spindle carrier 43 is the tracer support bracket 56 carrying the tracer valve 57 having a pattern contacting tracer disc 58 which is the same diameter as the cutters 51 being utilized to machine the work. This tracer disc is arranged to engage the patterns of the pattern array P mounted rigidly on the pattern spindle 26 as best seen in Figures 4 and 9.

General operating cycle

In this particular exemplary disclosure the work piece comprises an airplane cylinder head W shown best in Figure 3. The cylinder head has a main cylindrical body portion upon which the heat radiating fins F are formed by milling slots S in the blank in planes perpendicular to the axis 59 of the cylinder barrel cavity 60 formed in the cylinder head. The cylinder head has integral rocker arm bosses 61 and 62 having locating surfaces 63. Cooperating locating and clamping means 64 are provided in the work fixtures 65 carried by the work tables or spindles 21 for accurately positioning and circumferentially locating the work on the work spindles in proper relationship with the cutters 51 and patterns P and with the axis 59 of the work W coinciding with the axis of rotation of the work spindle.

The slots to be cut are spaced axially of the work and may vary greatly as to continuity, depth, and configuration. For instance, in this specific work piece the metal to be removed to form the first slot 66 in group A, Figure 3, is indicated by the cross hatched portion 66 in Figure 5, and the cross hatched portions 73 and 75 in Figures 6 and 7 show the portions forming the first slots 73 and 75 of groups B and C respectively. The depth and configuration in the bottom of each slot is determined by its related template on the pattern spindle 26. Certain templates are shown superimposed on the diagrammatically shown work pieces W in Figures 5, 6, and 7. These templates cooperate with the tracer disc 58 of the tracer control valve 57 as the template spindle and work spindles rotate during the cutting operation.

In group A, Figures 3 and 5, the slots S are non-continuous in that no cutting is performed on the blank between the points 68 and 69, as in this portion there is an exhaust port 470 formed in the cylinder head through which area slots and fins are not to be provided. This non-cutting position is provided for by an extended portion 68, 70, 71, and 69 on the template 67. There are a series of these templates 67a in group A extending between template 67 up to template 74 as seen in Figure 4 and all of these templates have a coplanar area between the points 70 and 71 so as to form a continuous face 72 as seen in Figure 4.

The character of the slots of group B, Figure 3, is shown by the cross hatching 73 in Figure 6, and it is to be noted that these slots are of continuous character but of very irregular depth contour. The bottom configuration of these slots of group 2 is determined by the template 74 and additional templates 74a mounted thereabove up to the template 76 as shown in Figure 4.

Similarly, in Figure 7 is shown the type of slots to be machined for completing the fins of group C, these slots being continuous and of substantially circular profile depth and indicated by the cross hatch portion 75 of the work W. In this case the related template 76 and associated templates 76a up to the last template are of substantially circular form.

The various circles indicated generally as TC in Figures 5, 6, and 7 represent the periphery of the tracer disc 58 and the cutter 51 to show their relative positions with respect to the template and work as the work revolves during the cutting of the slots S; in the figures the work spindles and template being shown in one position while the cutters and tracer disc are positioned around it to simplify the illustration.

In this machine the slots S are successively machined in an automatic cycle beginning with the bottom slot 66, Figure 3, of the work piece and progressing upwardly through the slots of groups A, B, and C until the top slot 77 has been completed. The cutters and tracer are moved radially of the work spindles to initially present them to the work pieces and pattern by the forward movement of the cross slide. Upon engagement of the tracer with the pattern automatic tracer control of the cross slide movement takes place to reproduce the desired profile for the bottom of the slots. The relative feeding of the cutters and work pieces is effected by the rotation of the work spindles and pattern spindle, while the cutting speed of the cutters is maintained by the driving motors 52. The cutters and tracer are successively moved upwardly in indexing movement by the spindle carrier so as to present them step by step to each slot 66 to 77 inclusive, Figure 3, while the tracer disc moves up over the corresponding patterns 67 and 67a of the pattern array P, Figure 4.

At the beginning of a complete automatic work cycle, the work and pattern spindles are positioned in a predetermined rotary position with respect to the cross slide movement. This position is best shown in Figure 5 where the cross slide movement takes place along the line 79 to and from the work spindles and pattern spindle. Each of these spindles are stopped relative to this line 79 as indicated in Figure 5 and are located in this position at the beginning of the work cycle. The movement of the cross slide and spindle carrier is diagrammatically illustrated in Figure 9a. At the beginning of the cutting cycle the cross slide is in fully retracted position and the spindle carrier is in its lowest indexed position preparatory to cutting the first slot 66 in the work piece as indicated at the point 80, Figure 9a. As the cycle begins, the cross slide is moved forward at rapid traverse rate along the line 81, and at some point 82 the main driving motors 52 are energized to cause appropriate rotation of the cutter spindles and cutters 51. The cross slide continues to approach the work and as it nears the work a coarse feed 81a and then a fine feed 81b becomes effective as the tracer disc 58 engages the surface 72 of the first template 67, while at the same time the work spindles and pattern spindle start to rotate. Since the tracer disc is now in contact with the pattern it will automatically follow around the pattern as the work spindles rotate so that as the tracer passes around the point 71 of the first pattern 67 it will begin to cause the cross slide to move in toward the axis of rotation of the work spindles and thereby bring the cutters 51 into cutting engagement with the portion 66 of the slot to be machined.

In cases where the pattern is of such configuration that there is a rapid change of radial movement in the cross slide, it is desirable to provide an arrangement for automatically reducing the feeding movement of the cutter and work, i. e., reducing the rate of rotation of the work spindles, during such rapid radial movement. As the work rotation starts and the tracer disc engages the pattern 67 at a point 83 the work spindles rotate at a rapid feed rate until the tracer arrives at the point 84 whereupon the feed rate is reduced until the tracer disc arrives at the point 85. From this point on a relatively slow feeding rotation of the work spindles takes place while the tracer disc rounds the corner 71 and moves rapidly radially inwardly of the work spindles to the point 85a where the feed rate again begins to increase to the fast movement at the point 86. This rapid movement continues while cutting the substantially concentric portion 87 of the bottom of the slot 66 until the tracer disc arrives at the point 88 where the feed is gradually reduced for the relatively rapid radial withdrawal movement of the cross slide from the work piece in rounding the point 89 of the template. A rapid feeding rate is again utilized in cutting the concentric portion 90 of the template and then a slow feed again instituted in rounding the point 91 as the cross slide moves radially inward again cutting deeply into the metal of the slot 66. As soon as the concentric portion 92 is reached at the point 93 fast feed has again been established and the cutter continues to operate with rapid rate of rotation of the work pieces until radial outward movement must take place beginning at the point 94. Slow feed rotation is then effected as the cross slide moves outwardly and the tracer disc 51 rounds the point 70 of the template whereupon the rapid movement is again instituted for movement of the tracer along the face 72 of the templates of group A.

After having thus completed one slot 66 by variable feeding rates as described and the cutters and tracer disc again arrive at the point 83 the spindle carrier 43 will index up one notch, sliding the tracer disc 58 up on the surfaces 72 to the next template 67a above the template 67 while at all times maintaining contact of the tracer with the pattern array P. This can be readily accomplished since this portion of the template projects outwardly beyond the surface of the work piece so that during the indexing of the spindle carrier upward the cutters are not in engagement with the work. The cycle just described for the template 67 is then repeated in a similar fashion for all of the rest of the templates 67a in group A. These templates vary somewhat in contour from the first template illustrated in Figures 4 and 5. Thus, the spindle carrier is successively indexed up for each slot in group A for the positions 83a until the final indexed position 83b of group A is reached. As the tracer moved from the point 94 out to the point 70 of the last slot of group A the cross slide moves backwardly, completely clearing the cutters from contact with the rotating work pieces, to an intermediate indexing position shown at 95 in Figures 5, 6, 7, and 9a.

As the cross slide arrives at the intermediate indexing position 95 the spindle carrier 43 is indexed one slot so as to bring the tracer and cutter in proper relative position with the respective slot 73 and pattern 74 preparatory to beginning the machining operation of the slots of group B. The cross slide then moves forward with the work spindles rotating and imbeds the rotating cutters into the work piece until the tracer disc properly engages the respective pattern 74 shown in Figure 6 whereupon tracer control of the cross slide then takes place. An automatic timing device is rendered effective upon forward movement of the cross slide and cutters to a predetermined position where the cutters just clear the greatest radially outwardly extending portion of the work pieces, to maintain continued forward movement of the cross slide to imbed the cutters in the work and institute the tracer control movement while the work has rotated more than a complete revolution, sufficient to finish the cut in that particular slot. As soon as this timer has concluded the interval necessary for the 360° plus rotation of the work while under tracer control, the cross slide is again automatically retracted from the work removing the cutters from engagement with the cylinder heads and the tracer disc from its corresponding pattern. When again the cross slide reaches the intermediate indexing position the next indexing motion takes place moving the spindle carrier for machining the next slot in group B.

This sequence of events, of moving the cross slide into depth while the spindles are rotating and then establishing proper tracer contact control with the pattern and at that point to institute a time interval control equivalent to a slightly more than 360° rotation of the work tables, is utilized to complete all of the slots of groups B and C. It is apparent that the initiation of the time interval after the cutters have been fed into the depth and tracer control takes place may occur at any circumferential position on the work piece so the beginning and ending of the actual cutting cycle on each of the slots of groups B and C may begin and end at any place around the work pieces. There is in connection with the slots of group B the same variable feed control of work spindle rotation as that for the slots of group A shown in Figure 5 so that whenever rapid changes of radial movement are required of the cross slide in moving in towards the work or away from the work, automatic means are provided in connection with the work spindle rotation to decrease the feeding movement during such rapid changes in position of the cross slide.

It will be noted with respect to the substantially concentric slots of group C that this variable feed rotation change in the work spindles is not required so that a uniform feeding motion takes place in machining these slots. In this latter case since a rapid continuous feed is used through the rotation of the work spindle the rotation of the work takes place in a shorter time than that of the group B slots shown in Figure 6. It is, therefore, necessary to utilize a timer with a shorter interval than that required for group B, and automatic means is provided when the spindle carrier moves to begin the cutting of the slots in group C to cut out the slower time for the group B slots and render operative a more rapid timer for the group C slots so as to properly effect the 360° plus rotation of the work. At the completion of the machining of the last slot 77 on the work piece the cross slide moves away from the work to the intermediate position 95, the cutters being then full retracted from the work. At this point a further indexing of the shaft 185 of the indexing mechanism of Figure 10 takes place at the point 96, Figure 9a.

The cross slide then moves backwardly simultaneously with the downward return movement of the spindle carrier so that the cutters and tracer travel along the path 97 and ultimately arrive at the fully retracted position 98 with the spindle carrier moved down slightly below the first index position for beginning the cutter cycle again. When this position 98 is reached, a final indexing movement of the spindle carrier upwardly takes place preparatory to beginning the next cutting cycle on the first slot 66 of group A as described, the pattern and work spindles stopping in the loading and unloading position shown in Figure 5.

Hydraulic operating system

The work spindles, cross slide, and spindle carrier are operated in their various movements by hydraulic fluid pressure actuating mechanism. Referring particularly to Figure 16, fluid pressure for rotating the work spindles is derived from a fluid pressure pump or feed pump 100, which receives a supply of fluid from a main hydraulic fluid reservoir 101 through a suction line 102. This fluid is delivered under pressure into the line 103 having a branch line 104 connected to a suitable relief valve 105 which in turn is connected through a drain line 106 to the reservoir 101, the relief valve serving to maintain the desired operating pressure in the line 103. The line 103 is connected to a manually operated selector valve 107, having an operating plunger 108 which may be moved axially by means of a control lever 109 movable to a hand position 109a and an automatic position 109b, the valve being shown in Figure 16 in the automatic position 109b. When in the manual position, fluid pressure from the line 103 of the feed pump is connected through the annular groove 110 of the valve plunger 108 to the line 111 connected to a manually operated throttle control valve 112. This valve has an operating hand wheel 113 on its plunger 113a arranged to provide regulation of the flow of fluid from the line 111 through the valve 112 to the line 114.

The line 114 is connected to the pilot operated table stop and start valve 115. This valve has a plunger 116 having an annular groove 117, which, as shown in Figure 16, is positioned so as to connect the line 114 to the line 118 which in turn is connected to the input of the hydraulic work table or work spindle rotating motor 34. Discharge from this motor takes place out through the line 119 into the drain line 120 for return of fluid to the reservoir 101. Under these conditions, by adjusting the hand wheel 113 of the throttle control valve 112 the rate of rotation of the motor 34 and therefore the rate of feeding rotation of the work spindles may be readily adjusted to suit the desired operating conditions. This particular arrangement is especially useful when initially setting up the machine or in instances where automatic variation of the rotary feeding motion of the work tables is not required.

A second fluid pressure pump or rapid traverse pump 121 derives a fluid supply from the reservoir 101 through the suction line 122 and delivers fluid under pressure into the main supply line 123 having a branch line 124 connected to a suitable pressure relief valve 125 connected to a drain line 126 for return of discharge fluid to the reservoir 101, this relief valve serving to maintain the desired pressure conditions in the line 123. Preferably, both the feed pump and rapid traverse pump may be driven by a suitable prime mover or electric motor (not shown). The rapid traverse pump 121 is preferably arranged to provide a greater volume of fluid than the feed pump 100 to effect a more rapid motion of the various devices which may be alternately connected to the rapid traverse pump or to the feed pump, and in some instances wherein both pumps are simultaneously connected to the devices to be operated.

Pressure from the rapid traverse pump 121 and the line 123 is utilized to operate the plunger 116 of the table stop and start valve 115 so as to control the stopping and starting of rotation of the work spindles. A branch line 123a of the pressure line 123 is connected to the solenoid operated reversing valve 124 having a plunger 125 connected by means of a suitable bell crank lever 126 to a pair of operating solenoids 127 and 128. When the solenoid 128 is energized to move the plunger 125 to the right, Figure 16, fluid pressure from the line 123a passes through the annular groove 129 in the valve plunger 125 into the line 130 which thus applies fluid pressure in the pressure chamber 131 behind the plunger 116 of the table stop and start valve 115 moving it to the position shown in Figure 16 to connect the feed pump pressure in the line 114 to the input line 118 of the work table rotating motor 34 to effect rotation of the work and pattern spindles. When the solenoid 127 is energized the valve plunger 125 of the valve 124 will be moved in the opposite direction, to the left Figure 16, so as to apply pressure from the line 123a through the annular groove 132 of the plunger 125 to the line 133 connected to the pressure chamber 134 of the table start and stop valve 115 to thereby move its plunger 116 to the left, Figure 16, to thus block off the line 118 connected to the input of the table motor 34 to arrest rotation of the work and pattern spindles. When pressure is supplied in the chamber 131 of the valve 115 discharge takes place from chamber 134 out through the line 133 and the annular groove 132 in valve plunger 125 into the drain line 120a which is connected to the drain line 120 for return of fluid to the reservoir 101. Similarly, when pressure is applied in the chamber 134 fluid is discharged from the pressure chamber 131 of the valve 115 through the line 130, annular groove 129 of valve plunger 125 into the drain line 120G which in turn is connected to the drain lines 120a and 120 for return of fluid to the reservoir 101. Thus, by energizing solenoid 128, the work spindles are caused to rotate and by energizing solenoid 127 the rotation of the work spindles is stopped.

The work tables may be actuated in rapid rotary motion or rapid traverse movement for purposes of inspecting the work while making set-ups and adjustments in the machine when the cross slide is retracted from the work. This is accomplished by providing a fluid supply from the rapid traverse pump 121 through the pressure lines 123 and 123a through a branch line 123c connected to the rapid traverse pilot operated valve 135 having an operating plunger 136 which when positioned to the left, Figure 16, connects fluid pressure from the line 123c through its annular groove 137 to the line 138 connected to the line 114 and then through the table stop and start valve 115 and the line 118 to the table rotating motor 34. The plunger 136 of the rapid traverse control valve 135 is actuated by fluid pressure from the line 123 through the branch lines 123d and 123e connected to the solenoid operated control valve 139 having an operating plunger 140 which is urged in one direction, to the left in Figure 16, by a compression spring 141 so that fluid pressure from the line 123 and the line 123e passes through the annular groove 142 of the plunger 140 into the line 143 connected to the pressure chamber 144 behind the plunger 136 of the rapid traverse valve 135 so as to move the plunger to the right, Figure 16, blocking off pressure supply from the line 123c to the table rotating motor 34. Discharge at this time passes out from the pressure chamber 145 of the valve 135 through the line 145 and the annular groove 147 of the solenoid operated control valve 139 into the drain line 120b connected to the drain line 120 for return of fluid to the reservoir 101.

Normally under the influence of the spring 141 rapid traverse pressure from the line 123c is cut off from the work spindles. When the solenoid 148 is energized, the plunger 140 is moved to compress the spring 141 to thereby connect pressure from the line 123d of the line 123 through the line 146 and pressure chamber 145 of the rapid traverse control valve 135 moving its plunger 136 so as to connect rapid traverse fluid pressure from the line 123c and the line 123 of the rapid traverse pump 121 to the line 118 connected to the input of the table rotating motor 34 to thereby effect the rapid traverse rotation of the work and pattern spindles. Thus, whenever solenoid 148 from the control valve 139 is energized rapid rotation or rapid traverse movement of the work and pattern tables is effected and when this solenoid is deenergized rapid traverse movement is stopped.

When the control lever 109 of the selector valve 107 is moved to the automatic position 109b indicated in Figure 16, fluid pressure is then connected from the feed pump 100 through the line 103 and annular groove 110 of the valve plunger 108 to the line 149 which is connected to the feed control ports 150, 151, and 152 of a series of valve plungers 153, 154, and 155 appropriately carried in a suitable valve housing 156. Each of these valve plungers is urged in one direction by compression springs 157, 158, and 159 so as to normally permit communication of fluid pressure from the line 149 through the respective annular grooves 160, 161, and 162 of each of the valve plungers with a common line 163 which is connected through the line 138 and line 114, the table stop and start valve 115, to the input line 118 for the work spindle rotating motor 34. The flow from the line 149 into the line 163 may be varied or completely cut off by axially moving the plungers against the respective compression springs to thereby variably throttle or shut off the flow and thus vary the feeding rotation of the work and pattern spindles.

Under this automatic operating condition the rapid traverse fluid pressure supply from the pump 121 is similarly varied and controlled by the valve plungers 153, 154, and 155. In this case pressure supply from the line 123 of the rapid traverse pump passes through the branch lines 123f communicating with the respective rapid traverse flow control ports 164, 165, and 166 associated with each of the plungers so that as the plungers are moved toward their greatest upward position, Figure 16, under the influence of their respective springs 157, 158, and 159 the flow from the rapid traverse pump will also be added to the feed pump supply through the line 163a connected to the line 163 and may be varied as to its amount by the axial position of the respective plungers. Thus, by appropriately positioning each of the plungers 153, 154, and 155 the feed supply from the pump 100 may be applied to the work spindle rotating motor 34 in varying amounts and this may then be supplemented for still greater speed of rotation of the work spindles by fluid pressure from the rapid traverse pump 121 which may also be varied by further positioning of the plungers 153, 154, and 155. Thus, a variable feed pump supply is provided which may be further supplemented by adding to it a variable rapid traverse pump supply to get a wide range of speed of rotation and thereby feed control for the rotary work and pattern spindles.

Each of the valve plungers 153, 154, and 155 may be rendered effective to control the variable feeding and rapid traverse movements of the work table by fully depressing the other two plungers so that they block off the flow from the respective feed and rapid traverse pumps to the supply line for the input of the work table rotating motor. In this particular embodiment each of the valve plungers is respectively associated with the machining operations of groups A, B, and C and is automatically rendered operative to effect variations in the rate of work spindle rotation for different circumferential positions of the work spindles with respect to the cutters and tracer. This is accomplished by providing a cam control means on one of the rotary tables, preferably the pattern table 26 as best seen in Figures 5, 6, 7, and 9. This arrangement comprises a series of cams 167, 168, and 169 which are fixed on a shaft 170 journaled in the base 20 mounted coaxially with the pattern spindle 26 and are positively connected by suitable coupling means 171 to the spindle to be rotated thereby. Each of these cams is provided when desired with a contour of varying radial extent so as to provide actuating rises or lugs 167a and 168a and depressed portions 167b and 168b, Figure 5, against which operate plungers 172, 173, and 174, Figures 9 and 16, adapted to engage each of the respective operating plungers 153, 154, and 155 of the feed and rapid traverse rate control valve plungers.

Thus, as the spindles rotate and the pattern spindle 126 revolves carrying with it the cam 167, the various high and low portions 167a and 167b will effect axial changes in position of the control plunger 153 to thereby effect the decrease and increase in the rate of rotation of the work tables in a manner as illustrated in Figure 5. In this instance, the plunger 153 and its associated cam 167 are arranged to particularly take care of rapid changes of radial inward and outward movement of the cross slide in connection with the slots to be milled in group A as described. When the plunger 153 is thus being actuated by the cam 167 in machining the slots of group A the other two plungers are held down in fully depressed condition against their respective springs so as to close off the supplies of fluid from the feed and rapid traverse pumps and thus render them inoperative, permitting the plunger 153 alone to effect the complete control.

Similarly, in referring to Figure 6, there is provided the control cam 168 having the control portions 168a and the depressed portion 168b cooperating with the plunger 173 operating against the valve plunger 154 to similarly effect a different increase and decrease of feed rates in the work spindle rotation when the slots of group B are being machined.

In the slots to be machined in group C, a perfectly circular cam 169 may be utilized so that its diameter will determine a uniform relatively fixed position for the plunger 155 to thereby maintain a uniform desired feed rate of rotation for the work spindles. It is obvious, however, that any selection of cams may be readily applied in any of these three positions to readily provide any desired variable speed of rotation for the work spindles to any characteristic of the work.

Thus, in this arrangement there is provided a control arrangement for varying the rate of feeding rotation of the work and pattern spindles at different circumferential portions of spindle rotation and to also automatically selectively effect a change in the character of this variable feed of the work spindles for different portions of a work piece being machined.

Each of the plungers 153, 154, and 155 is respectively rendered effective in accordance with the indexing of the spindle carrier 43 to various predetermined indexed positions as the work cycle proceeds. Vertical indexing movement of the spindle carrier is effected by fluid pressure from the rapid traverse pump 121 transmitted through the line 123 and the line 123g, Figure 16, which is connected to the solenoid operated indexing valve 175 having a plunger 176 urged in one direction by compression spring 177 and in the opposite direction by energizing the solenoid 178. Normally when the solenoid 178 is deenergized pressure supply from the line 123g is blocked at the valve 175. When the solenoid 178 is energized to effect an indexing motion of the spindle carrier, fluid pressure is then connected from the line 123g through the annular groove 179 of the valve plunger 176 to the line 180 causing pressure to be delivered to the chamber 181 of the detent plunger cylinder 182, Figures 10, 13, and 16, to thus cause withdrawal of the detent plunger 183 from the detent notch disc 184 fixed on the shaft 185 of the index control assembly journaled in suitable bearings 186 and 187 in the spindle carrier 43. This detent plunger 183 is thus moved back against a compression spring 188 in the pressure chamber 189 of the detent plunger cylinder 182, fluid being discharged from this chamber out to a line 190 through the annular groove 191 of the plunger 192 of a control valve 193, Figures 12 and 16, where it enters the drain line 194 for return of fluid to the reservoir 101.

As the detent plunger 183 is fully withdrawn from the detent disc 184 fluid pressure from the line 180 is then connected into the line 195 and is thus transmitted to the pressure chamber 196, Figures 10 and 12, behind the ratchet plunger 197, this plunger having a pawl 198 adapted to successively engage the various indexing notches 199 formed in the ratchet wheel 200 fixed on the shaft 185. As pressure builds up in the chamber 196 the ratchet plunger 197 is moved to the right to the position shown in Figure 12 so as to cause the pawl 198 to rotate the disc 200 and shaft 185 one indexed position. As the plunger 197 reaches its forward indexing position, as shown in Figure 12, plunger 192 of the control valve 193 is so moved that fluid pressure is now connected from the line 190 to the pressure line 123h connected to the pressure line 123 from the rapid traverse pump 121, thus causing pressure to be applied in the line 190 and therefore in the chamber 189 to rapidly move the detent plunger 183 back into engagement with the disc 184.

As soon as the indexing has thus been completed and the solenoid 178 of the control valve 175 is deenergized, the valve plunger 176 will assume the position shown in Figure 16 wherein the chamber 181 of the detent plunger cylinder 182 is connected through the line 188 to the drain line 120c and the line 120 for return of fluid to the reservoir 101. At the same time the compression spring 201 behind the plunger 192 of the valve 193 serves to automatically return the ratchet plunger 197 allowing the pawl to drop into the next successive notch 199 of the ratchet disc 200. At the same time fluid is discharged from the pressure chamber behind the ratchet plunger 197 out through the line 195 and the check valve 202 in the line 203 which in turn is connected appropriately to the line 180 through chamber 181 so that when solenoid 178 of the indexing valve 175 is deenergized line 180 is connected to the drain line 120 as described. Thus, whenever solenoid 178 is energized the shaft 185 of the indexing mechanism is indexed one notch and when the solenoid 178 is deenergized the apparatus is then set for another indexing upon again reenergizing the solenoid 178.

The vertical hydraulic actuating cylinder 44 for the cutter spindle carrier is controlled by means of a servo-valve 204, Figures 8 and 16, rigidly mounted on the cross slide 36 directly above the spindle carrier 43. This valve has an axially movable plunger 205 having a downwardly extending rod portion 206 having its end adapted to engage the steps 207 formed on the index positioning drum 208 journaled on a suitable shaft 209 against axial movement in a bracket 210 rigidly fixed to the spindle carrier 43. This drum 208 is adapted to be driven through suitable gearing indicated generally at G which may comprise a bevel gear 211 fixed on the shaft 209 and a mating bevel gear 212 appropriately journaled in the bracket 210 and driven through a universal joint 213, a drive shaft 214 and a universal joint 215 connected to the indexing shaft 185, Figure 1. The drive is so arranged that with indexing movement of the shaft 185 by the ratchet 200 the next step 207 of the indexing drum 208 will be presented under the servo-valve plunger 206.

At the beginning of a machining cycle with the spindle carrier in its lowest indexed position the rod 206 will be on its highest step 207a of the indexing drum 208 and as the indexing takes place the drum will be indexed so as to each time drop the rod 206 to the next lowest step until the final bottom step 207b of the cam drum is reached. With the servo-valve plunger 206 on the step 207a, indexing of the drum 208 one notch will momentarily cause the servo-valve plunger 206 to drop which will cause pressure from the line 123 and the branch line 123i to be connected through the annular groove 216 to the line 217 in turn connected to the lower chamber 218 of the cylinder 44 to thus cause the spindle carrier to be raised. This motion will continue until the next step now presented under the stem 206 of the servo 204 engages the stem and moves the valve to its neutral position, thus cutting off flow from the pressure line 123i to the line 217. During the upward movement with the servo-valve 205 downwardly displaced before it has been raised by contact with the next step of the drum 208, fluid is discharged from the chamber 219 of the cylinder 44 through the line 220, the annular groove 221 of the valve plunger 205 into the drain line 194 for return of fluid to the reservoir 101. Thus, as the shaft 185 is indexed by appropriately energizing the solenoid 178 of the indexing valve 175 the servo-valve will each time be momentarily unbalanced until the spindle and carrier 43 has moved up to the next desired indexed position, this process continuing until all of the indexed spaces on the drum 208 have been passed over and the plunger rod 206 of the servo-valve finally arrives at the last step 207b.

As the last indexed position 207b is reached a cam 221 fixed on the indexing shaft 185, Figures 10, 11, and 16, is arranged to actuate the plunger 222 of an index return control valve 223 so as to connect pressure from the line 123 through the line 123j, the annular groove 224 of the plunger 222 to the line 225 which is connected to a pressure chamber 226 behind a plunger 227, which through a suitable leverage arrangement 228 lifts the servo-valve plunger 205 upwardly as shown in Figures 8a and 16 so as to reverse the connections occurring during the normal step by step indexing to now connect pressure from the line 123i through the annular groove 221 of the plunger 205 to the line 220 which communicates with the upper chamber 219 of the cylinder 224 to rapidly move the cutter spindle carrier downwardly while fluid is being discharged at this time from the chamber 218 of the cylinder 44 out through the line 217, annular groove 216, into the drain line 194 for return of fluid to the reservoir 101. Thus, after the final indexing movement for the last slot, a final indexing of the shaft 185 actuates and causes the cam 221 to the valve plunger 222 to effect the return downwardly of the cutter spindle carrier to the low position 98 shown in Figure 9a.

Each of the variable rate control plungers 153, 154, and 155 is rendered selectively operative for different indexed positions of the cutter spindle carrier by means of a series of three control cams 229, 230, and 231, Figures 10, 11, and 16, each fixed on the indexing shaft 185 and having peripheral surfaces appropriately arranged to engage and actuate the respective control plungers 232, 233, and 234 of the control valves 235, 236, and 237. Each of these plungers is provided with a compression spring 238 to hold the plunger in engagement with the periphery of the respective control cam so that, for example, when a depressed portion of the cam 229 is presented to the plunger 232, the valve will be moved toward the cam by the spring 238 so as to block off pressure from the line 123 to the line 240 connected to the pressure plunger 241 and associated lever 242 and couple 240 to reservoir line 120 as shown in Figure 16. Under these conditions, the spring 157 of the variable feed control plunger 153 may move the plunger 153 outwardly into engagement with the control cam plunger 172 so that that particular control cam on the pattern spindle is now effecting control of the valve plunger 153 to vary the speed of work and pattern spindle rotation. In the meantime the other cams 230 and 231 are arranged to fully depress their respective plungers 233 and 234 so that fluid pressure from the pressure line 128h—137k is then transmitted through the respective annular groove portions 243 and 244 of these valves through the lines 245 and 246 to the respective pressure plungers 247 and 248 and associated levers 249 and 250 so as to depress the other two variable feed control plungers 154 and 155. The cams 229, 230 and 231 fixed on the indexing shaft 185 are so arranged that only one of the three variable feed control plungers is rendered effective to control the feed rotation of the work tables at any one time. It is also to be noted that these control cams 229, 230 and 231 may be so formed and oriented on the indexing shaft 185 that as the cutters are indexed to different portions of the work piece different variable feed control plungers may be rendered operative so as to automatically change the character of the variable feed cycle for each revolution of the work piece for different portions of the work piece being machined.

The cross slide movement is effected by fluid pressure supply from the rapid traverse pump 121 which is connected through a line 123L—123l to the cross slide servo-control valve 57 having an axially movable control plunger 251 which carries the tracer disc 58. A drain line 120 is also connected to the tracer control valve 57 which in turn is connected to the drain line 120 for discharge of fluid to the reservoir 101. Axial reciprocation of the plunger by engagement of the tracer disc 58 with the patterns P effects reversal of connection of the pressure and drain lines 123l and 120 to the lines 253 and 254. These lines are connected through the pilot operated stop and start valve 255 having a plunger 256 so arranged that when in the position shown in Figure 16 the line 254 is connected through the annular groove 257 to the line 258 going to the chamber 258a of the cross slide cylinder 37 while the line 253 is connected through the annular groove 259 through the line 260 and the check valve 261 to the line 262 connected to the other chamber 263 of the cross slide cylinder 37. Thus, by reciprocating the servo-valve plunger 251 the piston 39 actuating the cross slide may be reciprocated back and forth in the cylinder 37 to effect the usual tracer control action of said apparatus.

When the solenoid 264 of the control valve 265 is deenergized the valve plunger 266 is moved to a position by its compression spring 267 so as to connect pressure from the line 123m to the line 267a connected to the pressure chamber 268 of the valve 255 so as to position its plunger to connect the lines 253 and 254 from the servo-valve 57 to the cross slide cylinder as described. Discharge from the opposite pressure chamber 269 of the stop valve 255 at this time is connected through a line 270 to the drain line 120.

When the solenoid 264 is energized the valve plunger 266 is so shifted that pressure from the line 123m then is transmitted to the line 270 and the pressure chamber 269 of the stop valve 255, causing its plunger to be moved so as to block off the lines 253 and 254 from the tracer control valve 57 from connection with the cross slide cylinder. Discharge from the cylinder 268 of the start and stop valve 255 at this time passes out through the line 267a of the valve 265 into the drain line 120. Thus, when the solenoid 264 is energized its associated control valve prevents movement of the cross slide and when deenergized permits freedom of movement of the cross slide under control of the tracer valve 57.

Figure 2:
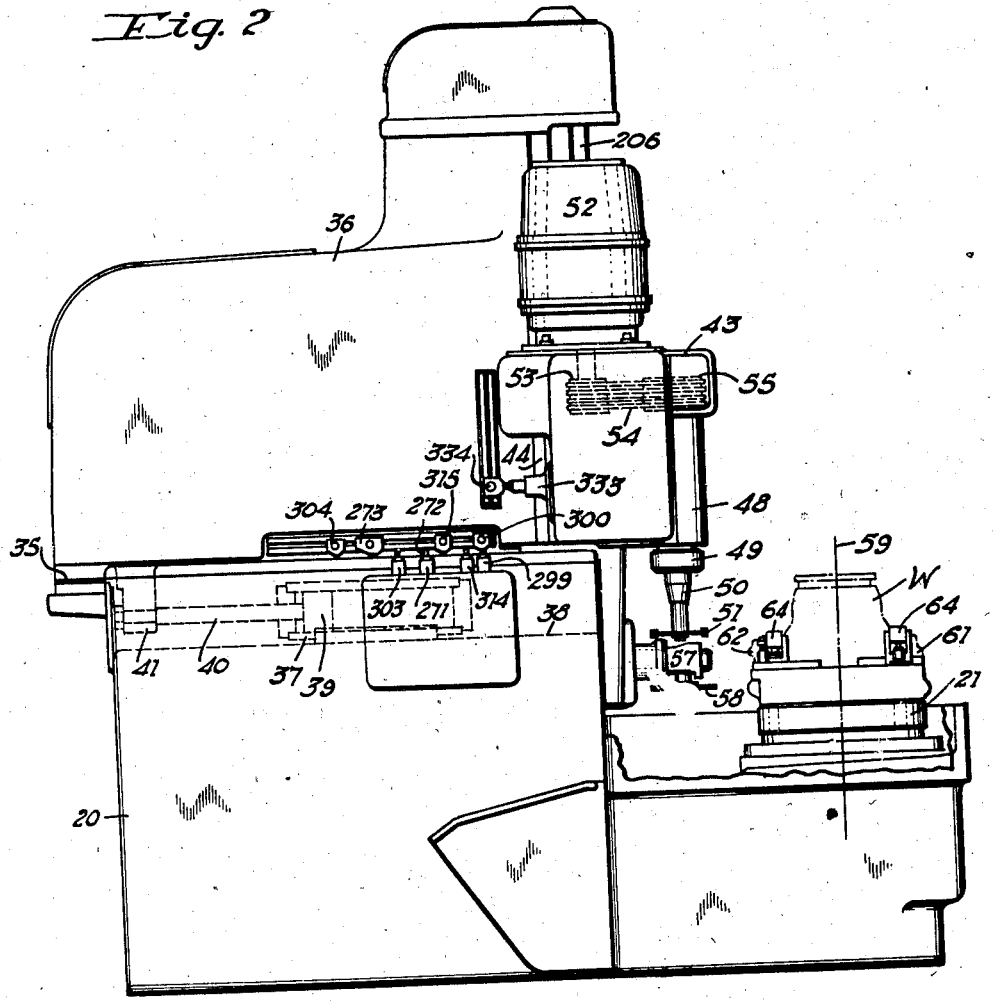
Figure 2 is a left hand end elevation of the machine shown in Figure 1.

As the cross slide moves forward from its retracted position there is provided an infeed throttle control valve 271 carried on the base of the machine and having an operating plunger 272, Figures 2 and 16, which is actuated from a cam 273 fixed on a cross slide 36 of the machine. The cam 273 is arranged to move the plunger 272 against the compression spring 274 upon movement of the cross slide so as to change the escape of fluid at the port 275. This port is connected through the usual pressure regulating valve 276 from the line 262a through a line 277 so as to regulate the discharge from the back pressure chamber 263 during infeed movement of the cross slide. Fluid discharges into the line 260 from the throttle valve 271 for return to the reservoir 101 through the stop valve 255 and the tracer control valve 57. The tracer valve during the infeeding motion is held undeflected by the compression spring 278 provided behind the tracer control valve plunger 251 to thus connect fluid pressure to chamber 258a of the cross slide cylinder for forward cross slide movement. Thus, when the tracer control valve is released to undeflected position by the spring 278 the cross slide moves forward at a rapid rate until the plunger 272 of the infeed throttle valve 271 engages the surface 273a of the control cam 273. This partially depresses the plunger 272 changing the rapid movement of the infeed to a coarse feed movement. Further movement of the cross slide is at this rate of feed until the plunger 272 engages the surface 273b of the cam 27 and further depresses the plunger against the spring 274 to further restrict discharge from the chamber 263 of the cross feed cylinder to effect a fine feeding motion of the cross slide.

When it is desired to move the cross slide back or rapidly return it to its retracted position 98, Figure 9a, the plunger 251 of the tracer valve 57 is overdeflected or moved outwardly by pressure plunger 279, Figure 16, operating against a suitable lever 280. This movement of the plunger and retraction of the tracer valve 251 is effected by fluid pressure from the line 123m which is connected to the solenoid operated control valve 281. When the solenoid 282 of this valve is energized the annular groove 283 of its plunger 284 connects pressure from the line 123m to the line 285 connected to the pressure plunger 279 which thus holds the tracer control valve plunger 251 in overdeflected position or in a position to cause the flow of fluid pressure through the line 253, annular groove 259 in plunger 256 of stop and start valve 255 into the line 260 and through the check valve into the line 262 connected to the chamber 263 of the cross slide cylinder. The return fluid from the other chamber 258a passes out through the line 258, annular groove 257 through the line 254 and the tracer control valve 57 back to the drain line 120 and the reservoir 101. When solenoid 286 is energized the control valve plunger 284 of the valve 281 is so moved as to connect the pressure plunger 279 to the drain line 120 so as to again release the tracer control valve plunger 251 and put it under control of the spring 278 or the pattern when the cross slide has moved forward sufficiently to engage the tracer disc therewith. Thus, energizing solenoid 282 causes retraction of the cross slide whereas energizing solenoid 286 releases the tracer for freedom of movement for tracer control in engagement with the pattern or for the forward movement of the cross slide when not contacting the pattern.

The positioning of the spindle carrier to machine any particular slot of the work piece may be readily accomplished manually by rotating the manual indexing adjustment knob 287, Figures 1, 9, 10, and 11, which is adapted to rotate the indexing control shaft 185 by means of a shaft 288 which carries the knob and has on its inner end a bevel pinion 289 meshing with a bevel gear 290 fixed on the shaft 185. An indicating dial 291 is also fixed on the shaft 185 and rotated therewith and has appropriate indicia 292 presentable to a suitable indicating window 293 when rotated to indicate to the operator the indexed position or the particular slot the machine is adjusted to cut.

*Electrical control*

With the feed and rapid traverse pumps 100 and 121 operating delivering pressure to their respective lines 103 and 123, Figure 16, the work cycle of the machine may be started by operating the cycle start switch 293, Figure 15, to complete a circuit from lead 294, limit switch 337, switch 293, lead 295, limit switch 296, lead 297, solenoid 286, and lead 298, to operate valve 281 so as to release the tracer plunger 251 and cause forward movement of the cross slide along the line 81, Figure 9a. At point 82 of the cross slide advance a limit switch 299, Figure 2, mounted on the base 20 is operated by a suitable dog 300 fixed on the cross slide 36 to complete a circuit from lead 294 through limit switch 299, lead 301, limit switch 296a, lead 302, cutter spindle driving motors 52, to lead 298 to start rotation of the cutter spindle 49.

As pointed out in connection with Figure 5, the work spindles and pattern tables up to this time are stopped in a definite starting position with respect to the direction of cross slide movement as shown in the figure. The cross slide continues to move forward through coarse feed and fine feed and just before the tracer disc 58 engages the first pattern 67 a limit switch 303, Figure 2, mounted on the base 20 is actuated by a dog 304 carried by the cross slide 36 completing a circuit from lead 294 through limit switch 303, lead 305, solenoid 128, to lead 298 to operate valve 124 and thus start rotation of the work and pattern spindles as the tracer engages the pattern and assumes control of the cross slide movement.

Mounted on the shaft 170, Figure 9, which is rotated by the pattern spindle 26, is a cam 306 having an actuating dog 307 located in a definite circumferential position with respect to the work and pattern so as to operate a limit switch 308 whenever the spindles are in the starting position for the cycle as shown in Figure 5. When the limit switch 308 is operated the solenoid 178 is energized by completion of a circuit from lead 294 through limit switch 308, lead 309, and solenoid 178 to lead 298 to thus momentarily operate the indexing valve 175 and effect an upward indexing movement to the next slot of the spindle carrier 43 as described. During the milling of the intermittent slots in group A, Figure 5, every rotation of the work and pattern spindles operates limit switch 308 to effect movement of the tracer disc up to the next pattern at the point 83, this sequence being repeated until the last slot in group A has been finished.

As the spindle carrier indexes to the last slot in group A, a limit switch 310, Figures 10 and 14, mounted on the spindle carrier is operated by a cam 311 on the indexing shaft 185 so that the next time the limit switch 308 is operated by the dog 307, a circuit will be completed from lead 294, through limit switch 308, lead 312, limit switch 310, lead 313, solenoid 282, to lead 298, to energize solenoid 282 to actuate valve 281 to withdraw the cross slide back from the work and pattern to the intermediate withdrawn position 95, Figure 6, sufficient to clear the cutters from the work pieces. At this point a limit switch 314 mounted on the base 20 is actuated by a dog 315 carried on the cross slide 36 completing a circuit from lead 294 through limit switch 314, lead 315, solenoid 264, to lead 298, energizing solenoid 264 to operate the cross slide stop valve to hold the cross slide at the intermediate position. Operation of limit switch 314 at this time also completes a circuit from lead 294, limit switch 314, lead 316, lead 309, and indexing solenoid 178 to lead 298 to index the spindle carrier into position to cut the first slot 73 in group B.

The cross slide is again moved forward, after the indexing movement has been properly completed, by the operation of the microswitch 296 mounted on the indexing servo-valve 204, Figure 8a. This limit switch is operated by a push rod 317 slidably mounted in a suitable axial bore in the rod portion 206 of the servo-valve plunger 205. On the upper end of the push rod is provided an adjusting nut 318 which is adapted to abut against the end 206a of rod portion 206 of the servo-valve with the lower end 317a of the push rod projecting slightly below the end 206b of the rod portion 206 when not in contact with the drum 208 during the spindle carrier indexing. As an indexed position is reached the end 206b of the rod seats against one of the steps 207 of the drum 208. The end 317a of the push rod 317 also engaged with the step is pushed upward to actuate a pin 319 slidably carried in the valve 204 which engages the abutment screw 320 in a lever 321 pivotally mounted on a suitable pin 322 carried on the valve 204. A compression spring 321b acting between the valve 204 and lever 321 normally holds the push rod 317 with its end 317a projecting outwardly beyond the surface 206b of the servo-valve plunger rod portion 206b. The lever 321 has an abutment surface 321a which operatively engages the limit switch 296.

When the push rod 317 is moved so that both the end 206b of the servo-valve plunger and the end 317b of the push rod simultaneously engage a step 207 of the drum when the indexing of the spindle carrier has been properly completed, the limit switch 296 is operated so as to complete the circuit, Figure 15, for the solenoid 286 to again institute forward movement of the cross slide. This arrangement for controlling the limit switch 296 is also effective to prevent starting the automatic machining cycle when operating the start button 293 by preventing energizing of the solenoid 286 to start forward movement of the cross slide unless the indexing of the spindle carrier has been properly completed. Contact 296b of the limit switch 296 deenergizes solenoids 127 and 282, unless the spindle carrier is properly indexed by breaking the circuit from 294 through contact 296b, and lead 323, and 313 through the solenoids to lead 298 to stop work spindle rotation and return the cross slide to the rear.

Upon indexing of the spindle carrier to the last slot in group A, causing limit switch 310 to be operated by cam 311 on the indexing shaft 185, a circuit is completed from lead 294 through limit switch 303, lead 324, limit switch 310, lead 325, timer relay 326, lead 327, to lead 298 so that as the cross slide moves in tripping limit switch 303, the electric timer relay 326 begins to operate maintaining solenoid 282 deenergized for a predetermined period of time sufficient for the work and pattern spindles to have rotated slightly more than 360° of a revolution after the tracer disc has engaged the pattern and the cutters have reached the full depth of the slot to be cut before the solenoid 282 is energized to withdraw the cross slide back to the intermediate position to again initiate an index of the spindle carrier. This sequence of operation continues until the last slot in group B is finished. Upon indexing of the spindle carrier to the first slot 75 in group C, limit switch 310 is operated by cam 311 on shaft 185 to render timer relay 326 ineffective while rendering a second timer relay 328 operative to similarly control the cross slide withdrawal solenoid 282 by completing a circuit from lead 294 through limit switch 303, lead 324, limit switch 310, lead 329, timer relay 328, lead 327, and solenoid 282 to lead 293. The second timer relay in this instance is set to effect cross slide withdrawal after a shorter interval of time because the higher steady rate of feed utilized in machining group C slots causes the work and pattern spindles to complete their 360° plus rotation in a shorter time than that required to complete a slot in group B. In the machining of the slots of groups B and C the work and pattern spindles are continuously rotating and the cross slide may present the cutters and tracer disc to the work and pattern at any circumferential position. The timer relay 326 or 328 automatically become effective upon tripping of limit switch 303 and as the cutters reach full depth of the slot tracer controlled full depth cutting continues until the work has rotated somewhat more than a complete revolution to completely finish the slot by a slight overlap of the cut.

As the spindle carrier indexes into position to cut the last slot in group C a cam 330 mounted on the indexing shaft 185, Figures 10 and 14, operates a limit switch 331 to complete a circuit from lead 294 through limit switch 331, leads 332 and 313, and solenoid 282 to lead 298 so that upon completion of the last slot the cross slide will continue to move back away from the work to fully retracted position 97a. During this backward movement limit switch 314 is actuated to index the spindle carrier to a blank position 96, Figure 9a, this indexing movement rotating indexing shaft 185 and cam 221 to operate valve 223 to hold the servo-valve plunger 205 upward, Figures 8a and 16, so as to cause the spindle carrier to return downward to position 98.

In thus raising the servo-valve plunger, the push rod 317 is released to drop under the influence of the compression spring 321b to so operate the micro switch 296 to open contacts 296a to stop the cutter spindles and open contacts 296b to stop rotation of the work spindles. As the spindle carrier arrives at its lowest position 98 a limit switch 333, Figure 2, mounted on the carrier engages a dog 334 on the cross slide 36 to complete a circuit from lead 294, through limit switch 333, leads 334 and 309, and solenoid 178, to lead 298 to effect a final indexing from position 98 to position 80, Figure 9a, to begin another complete automatic cutting cycle. As the spindle carrier is indexed to starting position 80 a limit switch 337 is operated by a cam 338 on the indexing shaft 185, Figures 10 and 14, to render the cycle start switch 293 effective to again initiate another working cycle when operated.

In certain instances it is desirable to rapidly rotate the work spindles or tables 21 and 26 as when inspecting the work and making adjustments and measurements in setting up the machine. This may be readily done by operating the work spindle rapid traverse switch 335 which completes a circuit from lead 294, through switch 335, lead 336, solenoid 148, to lead 298 to operate rapid traverse valve 139 to effect rapid rotation of the hydraulic work spindle driving motor 34.

What is claimed is:

1. In a pattern controlled milling machine, a rotary work holder, a rotary pattern holder, means for driving said holders in synchronism, a cross slide movable radially of said holders, power actuating means including tracer control mechanism to effect said radial movement, a spindle carrier movable on said cross slide axially of said holder adapted to carry a cutter and the tracer of said tracer control mechanism, power means for effecting axial movement of said spindle carrier to selected axial positions, and independent means alternatively rendered operative upon the axial movement of said carrier to automatically vary the rate of rotation of said holders for a particular axial selected position.

2. In a pattern controlled machine tool, a rotary work support, a cutting tool movable radially of the work support axis, means for progressively moving said cutting tool to selected positions axially of said work support, means for effecting some of said progressive movements in synchronism with the rotation of said support to a predetermined position, and means for effecting other of said progressive movements by the movement of said cutting tool to predetermined radial positions relative to said work support.

3. In a machine tool having a rotatable work holder and a cutting tool movable radially and axially of said work holder, a plurality of means alternatively operable during the rotation of said work holder to effect variations in the speed of rotation of said work holder at predetermined positions of rotation thereof, and means operable upon the axial movement of said cutting tool to predetermined positions to selectively determine which of said first-mentioned means will effect the variations in said workholder rotation.

4. In a pattern controlled milling machine, a rotatable work table and a rotatable pattern table, means for rotating said tables in timed relationship, a cutter and tracer carrier, means controlled by a tracer on said carrier to cause relative movement radially of the axis of rotation of said carrier and said tables, means for intermittently indexing said carrier axially of said tables, means for automatically maintaining said tracer in continuous contact with a pattern on said pattern spindle while said indexing movements are controlled by rotation of said tables to a predetermined position, means including a timer operative after a predetermined time interval has elapsed from initial contact of said tracer with said pattern to withdraw said carrier from said tables, and means to effect another portion of said indexing movements controlled by said timer.

5. In a pattern controlled milling machine, a frame, a rotary work table on said frame, a rotary pattern table on said frame, a cross slide movable radially of the axis of rotation of said tables, power means for actuating said cross slide, control means including a tracer for said power means, a pattern on said rotary pattern table adapted to be engaged by said tracer to effect tracer controlled radial movement of said cross slide with respect to said tables, a cutter on said cross slide adapted to engage a work piece on said work table, means for rotating said cutter, means for driving said work and pattern tables in synchronism, means for moving said tracer and cutter axially of said tables, means on said pattern table to control the operation of the driving means for said tables so as to vary the rate of rotation thereof at predetermined circumferential positions of rotation, and means effective in selected positions of the axial movement of said tracer and cutter to change the positions of variation of rotation of said tables.

6. In a rotary pattern controlled milling machine, a plurality of work spindles and a pattern spindle, a fluid pressure motor for simultaneously rotating said spindles in synchronism, a source of fluid pressure for operating said motor, control means for rendering said motor operative or inoperative, a carrier having rotatable milling cutters and a tracer mounted thereon adapted to respectively engage work pieces on said work spindles and a pattern on said pattern spindle, means whereby said tracer is adapted to tracer control radial relative movement of said cutters and work spindles, fluid pressure means for indexing said carrier axially of said spindles comprising, a hydraulic servo-control valve actuated by a stepped positioning cam rotated by said indexing mechanism whereby predetermined accurate indexed positions are successively effected in said carrier, a fluid pressure speed control means for said spindle driving motor to vary the rate of rotation of said spindles, and means operated by said indexing mechanism to actuate the speed control means to change the positions of variation of rotation of said spindles for different indexed positions of said carrier axially of said spindles.

7. In a pattern controlled milling machine having a work holder and a pattern holder, means for actuating said holders in feeding movement, a carrier movable in a plurality of directions relative to said holders, a tracer on said carrier adapted to engage a pattern on said pattern holder, a cutter on said carrier adapted to engage a work piece on said work holder, means whereby the engagement of said tracer with said pattern controls the relative position of said carrier in one direction with respect to said work holder, indexing mechanism operable to progressively actuate said carrier in another direction relative to said holders to predetermined indexed positions including, a power means for actuating said carrier in said second mentioned direction, control means operable by said indexing mechanism to intermittently render said power means effective for successively moving said carrier to said predetermined indexed positions, control devices for the work and pattern holder actuating means, and means whereby the operation of said indexing mechanism selectively actuates said control devices to change the rate of actuation of said spindles for different indexed positions of said carrier.

8. In a fluid pressure control system for a pattern controlled milling machine having, a work holder and a pattern holder synchronously driven by a fluid pressure motor, and a cross slide member movable relative to said holders, fluid pressure control means between a source of fluid pressure and said motor including a control mechanism for stopping and starting rotation of said holders, a fluid pressure control device for varying the rate of rotation of said holders at predetermined positions of their rotation, fluid pressure tracer control mechanism for moving said cross slide relative to said work holders in one direction of movement, fluid pressure operated indexing mechanism adapted to move a spindle carrier on said cross slide in another direction of movement, and a selective hydraulic control device automatically effective upon the movement of said carrier to predetermined indexed positions to change the positions of variation of speed of rotation of said holders.

9. In a fluid pressure control system for a hydraulically actuated tracer controlled machine tool having, a rotatable work spindle, a rotatable pattern spindle, a hydraulic motor for synchronously driving said spindles, a cross slide movable radially of said spindles, a hydraulic tracer control mechanism adapted to automatically determine the radial position of said cross slide in conformity with a pattern on said pattern spindle, electrically operated control means for operating said tracer so as to effect movement of said cross slide to or from tracer controlled position, electrically operated control means for arresting movement of said cross slide in any radial position of movement, hydraulic control means for automatically reducing the rate of movement of said cross slide to said spindles, a rotatable cutter mounted on said cross slide adapted to engage a work piece on said work holder to reproduce in said work piece a variable profile surface which is a replica of the pattern on said pattern spindle during said tracer control movement, and means for indexing said tracer and cutter axially of said spindles to successively reproduce various profile surfaces in axially spaced relationship on said work piece.

10. In a fluid pressure control system for a hydraulically actuated pattern controlled milling machine having rotatable work and pattern holders, a fluid pressure motor for synchronously driving said holders, a source of fluid pressure, a cross slide controlled by said source of fluid pressure through hydraulic control mechanism including a tracer operable in connection with a pattern on said pattern holder whereby the radial position of the cross slide having a cutter mounted thereon with respect to a work piece on said work holder is automatically tracer controlled, a hydraulically operated indexing mechanism, controlled at one time by the rotation of one of said holders to a predetermined position and controlled at another time by the relative radial position of said cross slide and holders, including hydraulic control mechanism for a hydraulically power operated carrier mounted on said cross slide whereby said tracer and cutter may be moved in step-by-step movement parallel to the axis of rotation of said holders, and a selective fluid pressure control mechanism interconnected with said fluid pressure motor adapted to vary the rate of rotation of said holders at different predetermined positions of rotation upon indexing of said cutter and tracer to predetermined positions axially of the work and pattern holders.

11. In a control mechanism for a pattern controlled milling machine having a rotatable work table, a rotatable pattern table, a cross slide movable radially of said tables, a spindle carrier on said cross slide movable axially of said tables, electric hydraulic operating and control mechanism including a fluid pressure motor for synchronously rotating said tables, a source of fluid pressure, control means for connecting said source of fluid pressure to said motor, means for controlling movement of said carrier to predetermined axial positions, including a hydraulic servo-control valve, a fluid pressure actuating cylinder for said carrier controlled by the valve, a stepped cam drum operatively engaging said servo-control valve, a hydraulically actuated indexing mechanism for rotating said cam drum to predetermined indexed positions, and an electrically operated control mechanism to effect continued operation of said machine including rotation of the tables only when said servo-control valve is accurately in proper engagement with said cam drum for each predetermined successive indexed position to be effected in said carrier.

12. In a machine tool, having a frame, a member movable on said frame, a hydraulic actuating cylinder to move said member, a reversing hydraulic servo-valve on said frame, an operating plunger in said valve, an indexing cam mounted on said member having a series of stepped abutment surfaces adapted to engage said plunger, means for intermittently actuating said cam to successively bring each of said steps in operative position with said plunger to thereby operate said valve to effect movement of said member to said predetermined positions, an electrical control switch on said frame, a mechanical actuator for said switch adapted to normally simultaneously engage the abutment surface engaged by said plunger when said member has been moved to an accurate predetermined position to thereby render said machine tool operative, and means whereby a small deviation from contact of said plunger with said abutment surface will cause said mechanical actuator to operate said switch to arrest further operation of said machine.

13. In a pattern controlled machine tool having rotatable work spindles and a pattern spindle, a cross slide movable relative to said spindles, a carrier on said cross slide movable perpendicular to said cross slide movement, cutting tools and a tracer on said carrier arranged in cooperative working relationship with work pieces and a pattern on said spindles, electrically operated control means for overdeflecting said tracer to move said cross slide to a retracted position relative to said spindles, manually operated electric switching means for said last-mentioned means operable to release said tracer from overdeflected position to effect forward movement of said cross slide to said spindles, and further electrical control means operable by the position of said carrier to control the operation of the means for overdeflecting said tracer.

14. In a pattern controlled machine tool having a rotatable work spindle and a pattern spindle, a cross slide movable radially of said spindles, power operable means for reciprocating said cross slide including a tracer control means, a carrier on said cross slide movable parallel to the axis of rotation of said spindles having said tracer control means and a cutter mounted thereon in operative relationship with said spindles, electrically operated control means for overdeflecting said tracer to retract said cross slide or to release said tracer to permit forward movement of said cross slide relative to said spindles, manually operated electric switching means for said electrically operated control means, and further electric control means to effect withdrawal and maintenance of said cross slide in a predetermined retracted position during movement of said carrier axially of said spindles.

15. In a pattern controlled machine tool having rotatable work and pattern spindles, means for driving said spindles in synchronism, electrical control means for said driving means effective to stop rotation of said spindles at a predetermined position, a cross slide movable relative to said work spindles having a tracer and cutter mounted thereon, electric control means operated by the movement of said cross slide to said spindles to initiate rotation of said work spindles from said predetermined stopped position upon approach of said tracer and cutter to working position relative to a pattern and work piece on said spindles, means for moving said cutter and tracer perpendicular to said cross slide movement, and electric control means for progressively effecting said perpendicular movement upon rotation of said spindles to said predetermined position.

16. In a pattern controlled milling machine having rotatable pattern and work supports, power means for rotating said supports, electric control means operable by the rotation of one of said supports to a predetermined position to stop rotation of said spindles at said position, a tracer and cutter movable radially of the axis of rotation of said spindles, electrically operated control means for said tracer to effect radial withdrawal of said tracer and cutter from said supports, means to effect progressive movement of said tracer and cutter axially of said supports, electrical control means for intermittently instituting said axial movement upon rotation of said supports to said predetermined rotary position during a portion of said axial movement, electrical control means rendered operative by the axial movement of said tracer and cutter to a predetermined position to automatically cause said tracer and cutter to withdraw from said supports, and means operable by said withdrawal to institute further axial movement of said tracer and cutter.

17. In a pattern controlled milling machine having rotatable pattern and work supports, power means for rotating said supports, electric control means operable by the rotation of one of said supports to a predetermined position to stop rotation of said supports at said position, a tracer and cutter movable radially of the axis of rotation of said supports, electrically operated control means for said tracer to effect radial withdrawal of said tracer and cutter from said supports, means to effect progressive movement of said tracer and cutter axially of said supports, electrical control means for intermittently instituting said axial movement upon rotation of said supports to said predetermined rotary position during a portion of said axial movement, electrical control means rendered operative by the axial movement of said tracer and cutter to a predetermined position to automatically cause said tracer and cutter to withdraw from said supports, means operable by said withdrawal to institute further axial movement of said tracer and cutter, and electrical control means operable by the axial movement of said tracer and cutter to a new axial position when in said retracted position to cause movement of the tracer and cutter radially toward said supports.

18. In a pattern controlled milling machine having rotatable pattern and work supports, power means for rotating said supports, electric control means operable by the rotation of one of said supports to a predetermined position to stop rotation of said supports at said position, a tracer and cutter movable radially of the axis of rotation of said supports, electrically operated control means for said tracer to effect radial withdrawal of said tracer and cutter from said supports, means to effect progressive movement of said tracer and cutter axially of said supports, electrical control means for intermittently instituting said axial movement upon rotation of said supports to said predetermined rotary position during a portion of said axial movement, electrical control means rendered operative by the axial movement of said tracer and cutter to a predetermined position to automatically cause said tracer and cutter to withdraw from said supports, means operable by said withdrawal to institute further axial movement of said tracer and cutter, electrical control means operable by the axial movement of said tracer and cutter to a new axial position when in said retracted position to cause movement of the tracer and cutter radially toward said supports, and an electrically operated means rendered effective by the axial movement of said tracer and cutter to still another predetermined position to automatically simultaneously effect radial and axial withdrawal movements in said tracer and cutter to an initial starting position.

19. In a pattern controlled machine tool having rotary pattern and work supports, a cross slide movable radially of said supports, a carrier on said cross slide movable axially of said supports, a tracer and a cutter on said carrier positioned for cooperative action with a pattern and work piece on said supports, means whereby said tracer controls the movement of said cross slide, electrically operated control means for said tracer to overdeflect said tracer for withdrawal of said cross slide from said supports or to release said tracer to permit said cross slide to move forward to bring said tracer into operative relationship with the pattern on the pattern support, power means for rotating said supports, electrically operated control means for said power means including a control switch operable by the rotation of one of said supports to a predetermined position to arrest rotation of said supports in a predetermined position, electric switch means operable by the rotation of said supports to said predetermined position to control the power means for said carrier to effect axial movement thereof with respect to said supports, and electric control means rendered operative by the axial movement of said carrier to a predetermined position to transfer control of said axial movement from the switch means operated by the rotation of said supports to an electric timing control mechanism rendered operative by the movement of said cross slide to a predetermined position toward said supports, and means whereby said timing device maintains said cross slide in forward operative relationship with said supports during at least one complete revolution of said supports.

20. In a tracer controlled milling machine having rotary pattern and work support, a cross slide movable radially of said supports, a carrier on said cross slide movable axially of said supports, a tracer and a cutter on said carrier located in operative relationship with a pattern and a work piece on said supports, electrically operated control means for said tracer, manually operated electrical switching means for said electrically operated control means to institute movement of said cross slide to said supports, means for rotating said supports, an electrically operated control means rendered effective by the forward movement of said cross slide to start rotation of said supports, electrically controlled means for effecting axial movement in said carrier including limit switch mechanism to render the machine inoperative unless said carrier has been moved to a predetermined accurate axial position, electrical switching means operated by the rotation of one of said supports to a predetermined position to initiate a portion of the progressive axial movements in said carrier, electric control means rendered operative by the movement of said carrier to a predetermined axial position to render said last-mentioned switching means inoperative while rendering electric timing mechanism operative, so that upon movement of said cross slide into working position said cross slide will be maintained in said position during at least one complete revolution of said supports, the initiation of the effectiveness of said timer being independent of the rotary position of said supports when said cross slide is moved forward to operative position.

21. In a tracer controlled milling machine having rotary pattern and work supports, a cross slide movable radially of said supports, a carrier on said cross slide movable axially of said supports, a tracer and a cutter on said carrier located in operative relationship with a pattern and a work piece on said supports, electrically operated control means for said tracer, manually operated electrical switching means for said electrically operated control means to institute movement of said cross slide to said supports, means for rotating said supports, an electrically operated control means rendered effective by the forward movement of said cross slide to start rotation of said supports, electrically controlled means for effecting axial movement in said carrier including limit switch mechanism to render the machine inoperative unless said carrier has been moved to a predetermined accurate axial position, electrical switching means operated by the rotation of one of said supports to a predetermined position to initiate a portion of the progressive axial movements in said carrier, electric control means rendered operative by the movement of said carrier to a predetermined axial position to render said last-mentioned switching means inoperative while rendering electric timing mechanism operative, so that upon movement of said cross slide into working position said cross slide will be maintained in said position during at least one complete revolution of said supports, the initiation of the effectiveness of said timer being independent of the rotary position of said supports when said cross slide is moved forward to operative position, and means whereby further electrical timing devices may be automatically rendered effective to control the positioning of said cross slide in operative position upon movement of said carrier to further predetermined axial positions.

22. A machine for forming a plurality of contours on a work piece including a work support and a cutter support, a first means for variably adjusting the parts during a cutting operation to determine the resultant contour on the work piece, a second variable speed means for effecting relative feeding movement of the parts whereby the cutter will traverse the surface of the work, means for relatively positioning the parts for successive traversing operations, a plurality of feed rate control members, and means for selectively coupling said feed rate control members in operative relation to the variable speed means for control of the traverse rate.

23. A machine for forming a plurality of contours on a work piece including a work support and a cutter support, a first means for variably adjusting the parts during a cutting operation to determine the resultant contour on the work piece, a second variable speed means for effecting relative feeding movement of the parts whereby the cutter will traverse the surface of the work, means for relatively positioning the parts for successive traversing operations, a plurality of alternatively available feed rate control members, and means for automatically adjusting a selected feed rate controller during a particular traversing operation to vary the surface speed relationship between cutter and work.

24. A machine for forming a plurality of contours on a work piece including a work support and a cutter support, a first means for variably adjusting the parts during a cutting operation to determine the resultant contour on the work piece, a second variable speed means for effecting relative feeding movement of the parts whereby the cutter will traverse the surface of the work, means for relatively positioning the parts for successive traversing operations, a plurality of feed rate variators, feed and rapid traverse hydraulic circuits associated with each of said rate variators, and means for variably positioning a selected rate variator to determine the feed and rapid traverse movements effective during a selected traversing operation.

25. In a machine of the character described, the combination with a work support and a cutter support, means mounting the parts for relative movement in a first direction for determination of the contour to be produced on the work, means for effecting relative movement in a second direction for determination of the traversing of the work by the cutter, means for establishing relative movement of the parts in a third direction for establishment of successive cutting paths, a variable speed drive for effecting the traversing movement, a series of rate variators, means for selectively operatively associating said rate variators with the variable speed traversing drive whereby a particular rate variator may be placed in controlling relation to the drive for a selected cutting path, and means operable in synchronism with the relative traverse for variably positioning the selected rate variator whereby the rate of relative traverse may be automatically varied during traverse in a selected cutting path and by employment of a different rate variator differently varied in another cutting path.

26. In a fluid pressure control system for a pattern controlled milling machine embodying pattern holder and work holder means and a cutter carrier adapted to present a cutter in opposition to a work piece on the work holding means, said system including a source of fluid pressure, a fluid pressure motor for actuating the pattern and work holder means, control means for connecting said source of fluid pressure to said motor including means for determining actuation of said motor at a rapid and a variable slower rate of movement, a fluid pressure tracer controlled mechanism including a movable tracer contact for cooperation with a pattern on the pattern holder to effect a tracer controlled movement of the cutter carrier toward and from the work holder to control the action of a cutter on the carrier in reproducing a peripheral surface on a workpiece on said work holder, electrically operated control means for said tracer to move said tracer and cutter carrier to and from a tracer controlled position, electrically controlled means for arresting relative movement of said tracer and said carrier, and fluid control means for reducing the rate of relative movement of said carrier in the tracer controlled direction toward said holder operable independently of said tracer mechanism during the initial presentation of said carrier to tracer controlled position.

GEORGE A. LENSKY.
WINTHROP TRIBLE.
EDWARD W. YATES.

REFERENCES CITED

The following references are of record in the file of this patent:

UNITED STATES PATENTS

| Number | Name | Date |
| --- | --- | --- |
| 1,798,926 | Black | Mar. 31, 1931 |
| 1,840,231 | Harrison | Jan. 5, 1932 |
| 2,060,437 | Harley | Nov. 10, 1936 |
| 2,068,889 | Roehm | Jan. 26, 1937 |
| 2,068,890 | Sassen | Jan. 26, 1937 |
| 2,330,890 | Horlacher | Oct. 5, 1943 |
| 2,372,427 | Johnson | Mar. 27, 1945 |